(12) United States Patent
Shimoda et al.

(10) Patent No.: US 7,408,709 B2
(45) Date of Patent: Aug. 5, 2008

(54) SCREEN AND METHOD FOR MANUFACTURING THE SAME

(75) Inventors: Kazuhito Shimoda, Kanagawa (JP); Masayasu Kakinuma, Miyagi (JP); Takashi Watanabe, Miyagi (JP); Shunichi Kajiya, Miyagi (JP)

(73) Assignee: Sony Corporation, Tokyo (JP)

( * ) Notice: Subject to any disclaimer, the term of this patent is extended or adjusted under 35 U.S.C. 154(b) by 292 days.

(21) Appl. No.: 11/082,344

(22) Filed: Mar. 17, 2005

(65) Prior Publication Data

US 2005/0207007 A1   Sep. 22, 2005

(30) Foreign Application Priority Data

Mar. 18, 2004 (JP) ............................ P2004-078130
Aug. 10, 2004 (JP) ............................ P2004-233261
Mar. 15, 2005 (JP) ............................ P2005-073467

(51) Int. Cl.
*G03B 21/56* (2006.01)
*G03B 21/60* (2006.01)

(52) U.S. Cl. .................. 359/459; 359/443; 359/454; 359/460

(58) Field of Classification Search ................. 359/443, 359/454, 459–461
See application file for complete search history.

(56) References Cited

U.S. PATENT DOCUMENTS

| | | |
|---|---|---|
| 6,034,820 A | 3/2000 | Someno et al. |
| 6,847,483 B2 * | 1/2005 | Lippey et al. ............... 359/443 |
| 2003/0017316 A1 | 1/2003 | Pfaff et al. |
| 2003/0129404 A1 | 7/2003 | Argoitia et al. |
| 2004/0196551 A1 * | 10/2004 | Chubachi et al. ............ 359/455 |

FOREIGN PATENT DOCUMENTS

| | | |
|---|---|---|
| EP | 0 786 676 A2 | 7/1997 |
| EP | 1 324 114 A2 | 7/2003 |
| GB | 2 215 075 A | 9/1989 |
| JP | 9-160131 | 6/1997 |
| JP | P2000-305177 A | 11/2000 |
| JP | P2003-207608 A | 7/2003 |
| JP | P2004-38003 A | 2/2004 |
| JP | P2004-101558 A | 4/2004 |
| JP | P2004-163806 A | 6/2004 |

* cited by examiner

*Primary Examiner*—Diane I. Lee
*Assistant Examiner*—Magda Cruz
(74) *Attorney, Agent, or Firm*—Sonnenschein Nath & Rosenthal LLP

(57) ABSTRACT

A screen for displaying an image by projection light includes: a selectively reflective layer having reflection properties with respect to light in a specific wavelength region corresponding to the projection light, and having absorption properties with respect to light in a wavelength region other than the specific wavelength region. And the selectively reflective layer includes an optical multilayer film having a dielectric film and a light-absorbing thin film having transmission properties, and a reflective layer for reflecting light which has passed through the optical multilayer film.

43 Claims, 10 Drawing Sheets

SCREEN AND METHOD FOR MANUFACTURING THE SAME

CROSS REFERENCE TO RELATED APPLICATION

The present invention contains subject mater related to Japanese Patent Application Nos. JP2004-078130, JP2004-233261, and JP2005-073467 respectively filed in the Japanese Patent Office on Mar. 18, 2004, Aug. 10, 2004, and Mar. 15, 2005, the entire contents of those being incorporated herein by reference.

BACKGROUND OF THE INVENTION

1. Field of the Invention

The present invention relates to a screen which displays an image by projection light, and more particularly to a reflective screen and a method for manufacturing the same.

2. Description of Related Art

In recent years, as means of presenting materials in a conference and the like, data projectors are widely used, and video projectors and moving picture film projectors for home use are being spread. In these projectors, light emitted from a light source is spatially modulated by a light valve to form light image, and the light image is projected on a screen for projection through a lighting optic, such as a lens.

The projectors of this type include one which allows color images to appear using, as a light source, a lamp emitting white light including light of three primary colors, i.e., red (R), green (G), and blue (B) light, and using a transmissive liquid-crystal panel as a light valve. In this projector, white light emitted from the light source is split by a lighting optic into light rays of red, green, and blue, and the individual light rays are converged to predetermined optical paths. These light fluxes are spatially modulated by the liquid-crystal panel according to the image signals, and the modulated light fluxes are combined by a light combining unit to form color light image, and the color light image combined is magnified by means of a projection lens and projected on a screen.

Further, recently, as a projector which allows color images to appear, an apparatus using a narrow-band three primary-color light source as a light source, for example, a laser generator emitting narrow-band light of the three primary colors, and using a grating light valve (GLV) as a light valve has been developed. In this projector, light fluxes of the individual colors emitted from the laser generator are spatially modulated by the GLV according to the image signals. The modulated light fluxes are combined by a light combining unit like in the above-mentioned projectors to form color light image, and the color light image combined is magnified by means of a projection lens and projected on a screen.

In the above projectors, the screen which displays a projection image is roughly classified into a transmissive screen and a reflective screen. The transmissive screen is a screen which transmits light image emitted from a projector in the rear of the screen so that a projection image can be seen as the transmitted light, and the reflective screen is a screen which reflects light image emitted from a projector in front of the screen so that a projection image can be seen as the reflected light.

As the reflective screen, a beads screen or white screen which reflects and scatters projection light from a projector is used, and this screen also reflects light other than the projection light, i.e., ambient light, and hence not only the ambient light level but also the black level (black image luminance) are increased, and therefore the screen can display only an image having a low contrast (=white level/black level) in the bright light at a high ambient light level, and thus the room must be dim for lowering the ambient light level.

For solving the problem, there has been proposed a screen in which a light absorbing layer is formed in front of a reflective layer to lower the black level, improving the contrast in the ambient light (see, for example, patent document 1 below). However, in this case, the light absorbing layer absorbs not only the ambient light but also the projection light, and therefore the white level is lowered to reduce the screen gain (luminance), and further the improvement of the contrast in the bright light is not satisfactory.

In addition, there has been proposed a screen shown in FIG. 25, in which a transparent layer 103 having a plurality of protrusions 102 is formed on a diffuser panel 101 on the surface of the screen and an opaque layer 104 including a black coating composition is formed on the sidewall of each protrusion to absorb ambient light, improving the contrast in the ambient light without lowering the white level (see, for example, patent document 2 below). However, in this case, the ambient light from the front of the screen is not absorbed and the improvement of the contrast in the bright light is not satisfactory, and further there is a problem in that a prolonged time and a cumbersome process are required in forming the protrusions and the opaque layer on the sidewall of each protrusion.

[Patent document 1] Japanese Patent No. 3103802
[Patent document 2] Japanese Patent No. 2889153

SUMMARY OF THE INVENTION

As mentioned above, the conventional technique is difficult to obtain a screen having high luminance and high contrast such that it can display a clear and sharp image in the bright light at a high ambient light level.

In view of the above problems, the present invention has been achieved, and a task is to provide a screen which can achieve high luminance and high contrast in the bright light without having a complicated structure, and a method for manufacturing the same.

According to an embodiment of the present invention, there is provided a screen for displaying an image by projection light, which includes a selectively reflective layer having reflection properties with respect to light in a specific wavelength region corresponding to the projection light, and having absorption properties with respect to light in a wavelength region other than the specific wavelength region, wherein the selectively reflective layer includes an optical multilayer film having a dielectric film and a light-absorbing thin film having transmission properties, and a reflective layer for reflecting light which has passed through the optical multilayer film.

According to the above-mentioned embodiment of the present invention, among the incident light to the selectively reflective layer including the optical multilayer film and the reflective layer, light in a specific wavelength region corresponding to the projection light is reflected and light in the other wavelength region is absorbed. Therefore, the black level depending on ambient light can be lowered without lowering the white level depending on the projection light, so that a screen having high luminance and high contrast in the bright light can be obtained.

The reflective layer used in the selectively reflective layer is, for example, a metallic substrate, a metallic film formed on a substrate, or a metallic film formed on the optical multilayer film, and, as a metal material for the reflective layer, a metal of any one of Al, Nb, and Ag or an alloy thereof is preferably used. When the reflective layer is the metallic film, the metallic film needs such a thickness that it does not transmit light, and a preferred thickness is 50 nm or more.

The optical multilayer film includes at least one layer of the dielectric film and at least one layer of the light-absorbing thin film having transmission properties, which films are stacked on one another. In the dielectric film, for example, $Nb_2O_5$, $TiO_2$, $Ta_2O_5$, $Al_2O_3$, $SiO_2$, or the like is used. Alternatively, a thermosetting resin which is transparent in the wavelength region of visible light, or the like can be used. The thickness of the dielectric film is designed depending on the refractive index of the dielectric film and the wavelength region of light to be reflected, i.e., specific wavelength region. As the specific wavelength region, a main constituent wavelength region of the projection light, for example, wavelength regions of RGB three primary colors are selected. When the intensities of light of the respective RGB colors are different in the light source of the projection light, the reflection intensities of the selectively reflective layer with respect to the light of the respective RGB colors are controlled by appropriately designing the structure and thickness of the films constituting the optical multilayer film, correcting the color bias of an image due to dispersion of the intensities of the RGB colors. Further, when the ambient light level is high due to light from a fluorescent light or the like, by designing the structure and thickness of the films constituting the optical multilayer film so that the wavelength region in which the selectively reflective layer exhibits absorption properties includes the wavelength of a bright line peak of the fluorescent light, the black level of the screen can be lowered while keeping the white level high.

In case that the light from a halogen lamp is an ambient light, the image displayed by regions of the wavelength, that is, the region between the wavelength of bright line peak of red component light and that of bright line peak of green component light, and the region between the wavelength of bright line peak of green component light and that of bright line peak of blue component light, respectively of the light source of the projection light (possible light source), is affected by the ambient light, where the intensity of the projection light is low. Therefore, it is preferred that these wavelength regions correspond to those regions in which the selectively reflective layer exhibits absorption properties by appropriately designing the structure and thickness of the films constituting the optical multilayer film.

The light-absorbing thin film having transmission properties is formed from a material having a refractive index of 1 or more and an absorption coefficient of 0.5 or more. Examples of such materials include Nb, Nb alloys, C, Cr, Fe, Ge, Ni, Pd, Pt, Rh, Ti, TiN, $TiN_xW_y$, Mn, Ru, and PbTe. It is preferred that the light-absorbing thin film has a thickness in the range of from 5 to 20 nm. When the thickness is less than 5 nm, desired light absorption cannot be achieved, and, when the thickness is more than 20 nm, the required transmission properties may deteriorate.

For achieving display of an image having excellent visibility, it is preferred that a diffusion layer for scattering the reflected light is formed on the selectively reflective layer. It is further preferred that an adhesive layer is formed between the diffusion layer and the selectively reflective layer, and the adhesive layer combines both layers and includes coloring material which absorbs the light in a specific wavelength region. Especially, the adhesive layer preferably contains black dye.

Alternatively, a construction may be employed such that, instead of the diffusion layer, a plurality of protruding portions or depressed portions are formed as a diffusing structure on the surface of a substrate and the selectively reflective layer having a uniform thickness is formed on the diffusing structure.

The screen can be manufactured by the methods according to the embodiments of the present invention.

According to an embodiment of the present invention, there is provided a method for manufacturing a screen which includes a step for forming a selectively reflective layer having reflection properties with respect to light in a specific wavelength region and having absorption properties with respect to light in a wavelength region other than the specific wavelength region, wherein the step for forming a selectively reflective layer includes a step for forming, on a metallic substrate, an optical multilayer film including a dielectric film and a light-absorbing thin film having transmission properties. In the present invention, by forming the optical multilayer film on the metallic substrate which serves also as a reflective layer, a screen having desired selective reflection properties can be easily obtained.

According to an embodiment of the present invention, there is provided a method for manufacturing a screen, which includes a step for forming a selectively reflective layer having reflection properties with respect to light in a specific wavelength region and having absorption properties with respect to light in a wavelength region other than the specific wavelength region, wherein the step for forming a selectively reflective layer includes a step for forming a metallic film on a substrate, and a step for forming, on the metallic film, an optical multilayer film including a dielectric film and a light-absorbing thin film having transmission properties. In the present invention, an arbitrary substrate can be used, and hence a screen having desired selective reflection properties can be arbitrarily designed according to the way of using the screen.

Further, according to an embodiment of the present invention, there is provided a method for manufacturing a screen, which includes a step for forming a selectively reflective layer having reflection properties with respect to light in a specific wavelength region and having absorption properties with respect to light in a wavelength region other than the specific wavelength region, wherein the step for forming a selectively reflective layer includes a step for forming, on the back surface of a diffuser panel, an optical multilayer film including a dielectric film and a light-absorbing thin film having transmission properties, and a step for forming a metallic film on the optical multilayer film. In the present invention, a substrate is not needed, and therefore not only is the structure of the screen further simplified, but also the cost for production can be lowered.

According to an embodiment of the present invention, the selectively reflective layer, which reflects light in a specific wavelength region and absorbs light in a wavelength region other than the specific wavelength region, includes an optical multilayer film and a reflective layer, and therefore, the projection light is mainly reflected and almost all the ambient light can be absorbed, thus achieving a screen having high luminance and high contrast in the bright light.

According to an embodiment of the present invention, by using a metallic substrate as the reflective layer, a screen having desired selective reflection properties can be obtained by merely forming the optical multilayer film.

According to an embodiment of the present invention, by using a metallic film as the reflective layer, an arbitrary screen substrate can be used, or a substrate can be omitted by forming the metallic film on the optical multilayer film.

According to an embodiment of the present invention, by forming a diffusion layer on the selectively reflective layer, the viewing characteristics can be improved.

According to an embodiment of the present invention, by forming, between the diffusion layer and the selectively reflective layer, an adhesive layer having light absorption properties, which absorbs the light in the specific wavelength region, white balance of the image displayed on the screen is adjustable, and the contrast of the image is also improved.

According to an embodiment of the present invention, by forming protruding portions or depressed portions on the surface of the reflective layer, the viewing characteristics can be improved, thus making it unnecessary to form a diffusion layer on the selectively reflective layer.

According to an embodiment of the present invention, by using the selectively reflective layer having reflection intensities in the wavelength regions of the respective RGB colors adjusted according to the intensities of the projection light in the wavelength regions of the respective RGB colors, the color bias of an image due to the light source of the projection light can be corrected.

According to an embodiment of the present invention, the selectively reflective layer has high reflection properties with respect to projector light and high absorption properties with respect to ambient light from a fluorescent light or the like, and therefore the black level of the screen can be lowered while keeping the white level high even in an environment at a high ambient light level.

According to an embodiment of the present invention, by forming, on a metallic substrate, the optical multilayer film including a dielectric film and a light-absorbing thin film, a screen having reflection properties with respect to light in a specific wavelength region and having absorption properties with respect to light in a wavelength region other than the specific wavelength region can be easily obtained.

According to an embodiment of the present invention, by forming a metallic film on a substrate and forming the optical multilayer film including a dielectric film and a light-absorbing thin film on the metallic film, a screen having reflection properties with respect to light in a specific wavelength region and having absorption properties with respect to light in a wavelength region other than the specific wavelength region can be easily obtained using an arbitrary substrate.

According to an embodiment of the present invention, by forming, on the back surface of a diffuser panel, the optical multilayer film in the order opposite to the order of formation of the optical multilayer film on the substrate, and finally forming a metallic film, a screen having reflection properties with respect to light in a specific wavelength region and having absorption properties with respect to light in a wavelength region other than the specific wavelength region can be easily obtained without using a substrate.

Further features of the invention, and the advantages offered thereby, are explained in detail hereinafter, in reference to specific embodiments of the invention illustrated in the accompanying drawings.

DESCRIPTION OF THE PREFERRED EMBODIMENTS

Hereinbelow, the embodiments of the present invention will be described with reference to the drawings.

Figure 1:
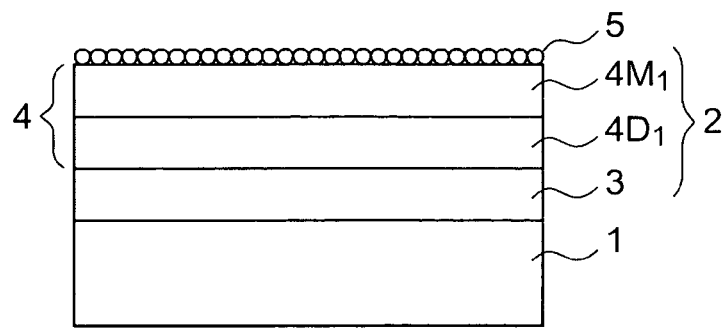
FIG. 1 is a cross-sectional view of a screen according to the first embodiment of the present invention.

FIG. 1 shows a screen according to the first embodiment of the present invention, in which, on a substrate 1, as a selectively reflective layer 2 which reflects light in a specific wavelength region, e.g., RGB three primary-color wavelength regions, and which absorbs light in a wavelength region other than the specific wavelength region, a metallic film 3 and an optical multilayer film 4 including a dielectric film $4D_i$ (i=1, 2, ...) and a light-absorbing thin film $4M_j$ (j=1, 2, ...) having transmission properties are formed, and further a diffusion layer 5 for scattering the light reflected by the selectively reflective layer 2 is formed on the selectively reflective layer.

The substrate 1 supports the screen, and various materials can be used in the substrate. When flexibility is imparted to the screen, a plastic film having a thickness, for example, in the order of 100 μm is used. Examples of plastic materials include polycarbonate (PC), polyethylene terephthalate (PET), polyethylene naphthalate (PEN), polyethersulfone (PES), and polyolefin (PO).

The selectively reflective layer 2 is designed according to the wavelength region of the projection light, for example, three primary-color wavelength regions so that the selectively reflective layer reflects mainly the projection light from a projector and absorbs light in a wavelength region other than that of the projection light, and the wavelength region of the projection light varies depending on the light source of the projector. The selectively reflective layer 2 includes the metallic film 3, and the optical multilayer film 4 having at least the dielectric film $4D_1$ and the light-absorbing thin film $4M_1$ having transmission properties.

The metallic film 3 is formed as a reflective layer for reflecting light which has passed through the optical multilayer film 4, and it is preferred to use a metal material having substantially uniformly high reflectance over the wavelength region of visible light, for example, a metal, such as Al, Ag, or Nb, or an alloy thereof (e.g., an Al alloy, such as AlSiCu, or an Ag alloy, such as AgPdCu). The metallic film needs such a thickness that it does not transmit light, and a preferred thickness is 50 nm or more. The metallic film 3 is formed on the substrate 1 by using a vapor deposition method, a sputtering method, or the like.

The dielectric film $4D_i$ constituting the optical multilayer film 4 includes, for example, $Nb_2O_5$ (niobium pentoxide), $TiO_2$ (titanium dioxide), $Ta_2O_5$ (tantalum pentoxide), $Al_2O_3$ (aluminum oxide), or $SiO_2$ (silicon dioxide), and formed on the metallic film 3 or the light-absorbing thin film $4M_j$ using, for example, a sputtering method. Alternatively, the dielectric film $4D_i$ may include a resin film which is transparent in the wavelength region of visible light. In this case, the dielectric film can be formed using a thermosetting resin curable by heat or ultraviolet light, or the like by a coating method.

The light-absorbing thin film $4M_j$ having transmission properties is formed from a material having a refractive index of 1 or more and an absorption coefficient of 0.5 or more. Examples of such materials include Nb, Nb alloys, C, Cr, Fe, Ge, Ni, Pd, Pt, Rh, Ti, TiN, $TiN_xW_y$, Mn, Ru, and PbTe. It is preferred that the light-absorbing thin film has a thickness in the range of from 5 to 20 nm. When the thickness is less than 5 nm, satisfactory light absorption cannot be achieved, and, when the thickness is more than 20 nm, it is likely that the light transmission properties cannot be obtained. The light-absorbing thin film $4M_j$ is formed on the dielectric film $4D_i$ using, for example, a sputtering method.

In the selectively reflective layer 2, the optical multilayer film is designed so that the selectively reflective layer has high reflection properties with respect to light in, for example, three primary-color wavelength regions such that the reflectance is, e.g., 70% or more and high absorption properties with respect to light in a wavelength region other than the three primary-color wavelength regions such that the absorption is, e.g., 70% or more. When the thickness of the dielectric film $4D_i$ is taken as "d", the refractive index of the dielectric film is taken as "n", and the wavelength of the light to be reflected among the incident light to the optical multilayer film is taken as "λ", the thickness of the dielectric film $4D_i$ is designed so that, with respect to the wavelength λ, an optical thickness nd of the dielectric film satisfies an equation represented by the following mathematical formula 1:

$$nd=\lambda(\alpha\pm\frac{1}{4})\text{(wherein α is a natural number.)} \quad \text{[Mathematical formula 1]}$$

When the optical multilayer film is designed according to this formula so that each of the three primary-color wavelength region has a reflection peak, that is, in the dielectric film $4D_i$, three primary-color wavelengths are taken as "λ", and that an optical thickness nd is set to have almost the same value for each of the dielectric film $4D_i$ by adjusting the value of "α" for each wavelength of the three primary-colors, the dielectric film $4D_i$ becomes a thicker film because the optical thickness nd becomes, as a result, the least common multiple in the three primary-color wavelength. Further, by selecting material, that is, refractive index, of the dielectric film $4D_i$, the necessary thickness of a thick film can be determined and the dielectric film $4D_i$ solely satisfies the refraction for all the three primary-color wavelength thereby reducing the number of the stacked layers in the optical multilayer film 4. For example, in case that the dielectric film 4D1 right on the metallic film 3 has an optical thickness (nd) of 1000 or more (that is, in case that the constituting material of the dielectric film is $Nb_2O_5$ (n=2.3), d=435 nm or more, in case of $SiO_2$ (n=1.46), d=685 nm or more), a single layer of the dielectric film 4D1 as the dielectric film 4Di is possible to have s in three primary-color wavelength regions respectively.

Figure 2:
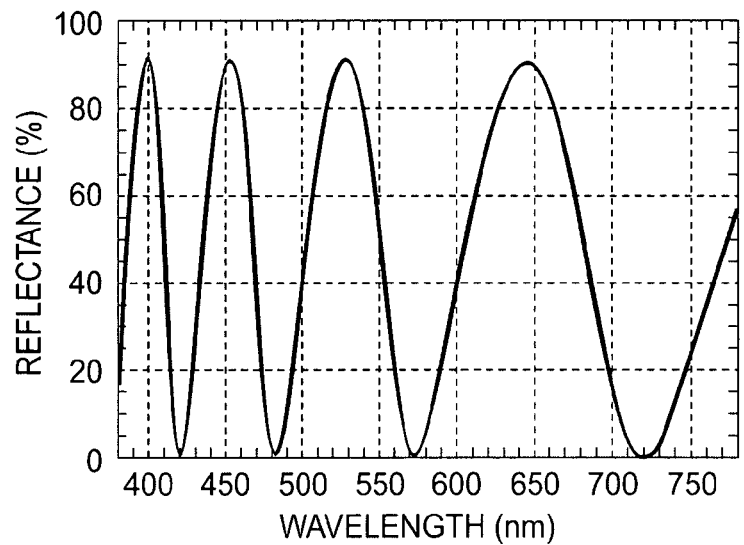
FIG. 2 is a diagram showing the reflection properties of a selectively reflective layer including Al/$Nb_2O_5$ (539 nm)/Nb (6 nm)

For example, in the construction in which the optical multilayer film 4 includes a dielectric film $4D_1$ including $Nb_2O_5$ and a light-absorbing thin film $4M_1$ including Nb, which are successively stacked on the metallic film 3 including Al, the selectively reflective layer 2 having optical characteristics shown in FIG. 2 can be obtained by appropriately designing the optical multilayer film. This design is made so that the selectively reflective layer has a reflectance as high as, e.g., 80% or more with respect to light in three primary-color wavelength regions, an absorption as high as, e.g., 80% or more with respect to light in a wavelength region other than the three primary-color wavelength regions, and a transmittance of, e.g., substantially 0% with respect to light in the whole wavelength region, and the Al film (metallic film 3) has a thickness of 50 nm, the $Nb_2O_5$ film (dielectric film $4D_1$) has a thickness of 539 nm, and the Nb film (light-absorbing thin film $4M_1$) has a thickness of 6 nm. Here, the design is made taking as an example the case where the wavelength region of red light (R) is about 642 nm, the wavelength region of green light (G) is about 532 nm, and the wavelength region of blue light (B) is about 457 nm.

The selectively reflective layer 2 having the above construction has high reflection properties with respect to light in three primary-color wavelength regions and high absorption properties with respect to light in a wavelength region other than the three primary-color wavelength regions, and therefore the black level of the screen can be lowered while keeping the white level high even in an environment at a high ambient light level. Further, the number of the stacked layers in the optical multilayer film 4 constituting the selectively reflective layer 2 is small and the thickness of the optical multilayer film is small, and therefore a screen having flexibility can be manufactured using a substrate having flexibility.

Further, in the present invention, it is possible to lessen the number of the stacked layers in the optical multilayer film by making the dielectric film 4Di a thick film, and as the design of the thickness of the respective layers constituting the optical multilayer film is smoothly achieved, there is an improvement that the manufacture of an optical multilayer film becomes easier.

If the dielectric film 4Di is formed as a screen having a large area, the thickness of the dielectric film deviates from the designed thickness, and by such deviations of the thickness the selectively reflective layer 2 has a possible problem in the optical properties as a screen. In the present invention, as the change in the optical properties of the dielectric film 4Di by the deviation of the thickness thereof is large, it is possible to detect a deviation in the thickness of the dielectric film easily, and adjust the thickness thereof. Hereinbelow, the method for adjusting the thickness will be described.

Figure 3:
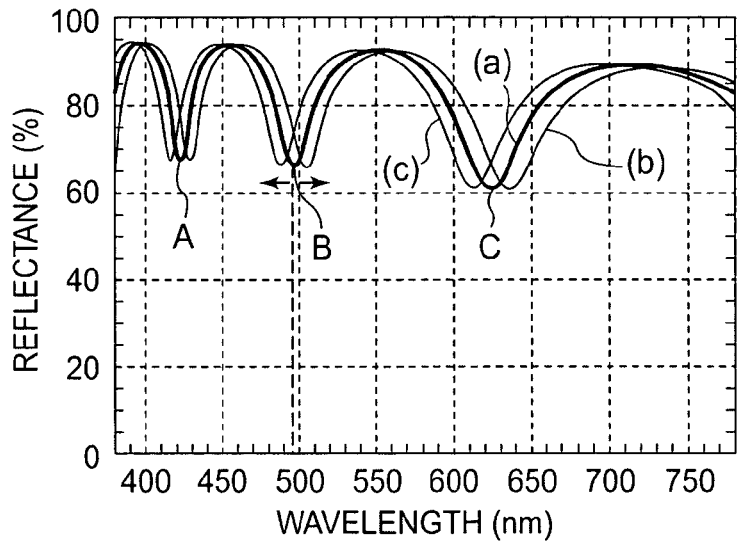
FIG. 3 is a diagram showing the reflection properties of a layer including Al/$Nb_2O_5$.

FIG. 3 is a diagram showing the reflection properties of a structure having a metallic film 3 (Al) formed thereon with a dielectric film 4Di including $Nb_2O_5$ In the diagram, a curved line (a) shows the reflectance properties in case that the dielectric film 4Di has the designed thickness (450 nm). The curved line has absorption peaks A, B, and C, where the reflectance has the bottom values. A curved line (b) shows the reflectance properties in case that the dielectric film 4Di has a thickness 1% larger than the designed thickness, and a curved line (c) shows the reflectance properties in case that the dielectric film 4Di has a thickness 1% smaller than the designed thickness.

Here, the curve of the reflectance properties has a tendency to shift in parallel with the direction of the wavelength axis according to the deviation of the thickness of the dielectric film 4Di. With the foregoing, the absorption peak shifts to the short wavelength side in case that the dielectric film has a thickness smaller than the designed thickness, and the absorption peak shifts to the long wavelength side in case that the dielectric film has a thickness larger than the designed thickness, and the amount of the shift is proportional to the amount of the deviation of the thickness of the dielectric film. Accordingly, it is possible to detect the deviation in the thickness of the dielectric film 4Di by monitoring any of the absorption peaks corresponding to the absorption peaks A, B, or C on the curved line (a).

For example, if the position of the absorption peak B (wavelength of about 495 nm) on the curved line (a) in FIG. 3, is learned in advance, it is possible to detect whether there is any deviation in the thickness of the dielectric film 4Di by measuring the reflectance properties of the manufactured dielectric film and comparing the corresponding peak position of the manufactured dielectric film with the peak position B. And, if the relation between the deviation in the thickness (difference between the actual thickness of the film and that of designed one) and the shift amount of the absorption peak is determined in advance, the deviation in the thickness of the manufactured dielectric film 4Di is determined only by measuring the position of the absorption peak, and therefore the adjustment is easily achieved. In FIG. 3, it is shown that even 1% deviation from the designed thickness of the dielectric film 4Di can be detected.

Figure 4:
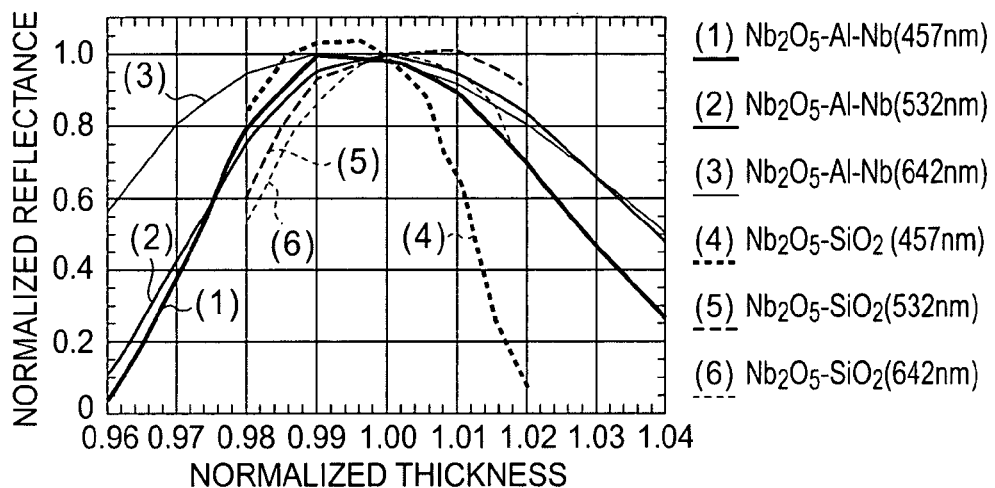
FIG. 4 is a diagram showing the thickness dependency of a reflectance in the three primary-color wavelength regions with respect to the selectively reflective layer.

When the thickness of each of the metallic film 3, dielectric film $4D_1$, and the light-absorbing thin film $4M_1$ in this construction is changed at the same rate, the reflectance changes in the wavelength regions of RGB are as shown by (1) to (3) in FIG. 4. Further, when the incident angle to the screen is changed, the reflectance changes in the wavelength regions of RGB are as shown by (1) to (3) in FIG. 5. As a comparative example, with respect to the selectively reflective layer in the screen proposed by the present applicant in Japanese Patent Application No. 2002-070799, the thickness dependency of the reflectance change is shown by (4) to (6) in FIG. 4, and the incident angle dependency of the reflectance change is shown by (4) to (6) in FIG. 5. The selectively reflective layer in the comparative example includes an optical multilayer film obtained by alternately stacking a high refractive-index layer ($Nb_2O_5$) and a low refractive-index layer ($SiO_2$).

Figure 5:
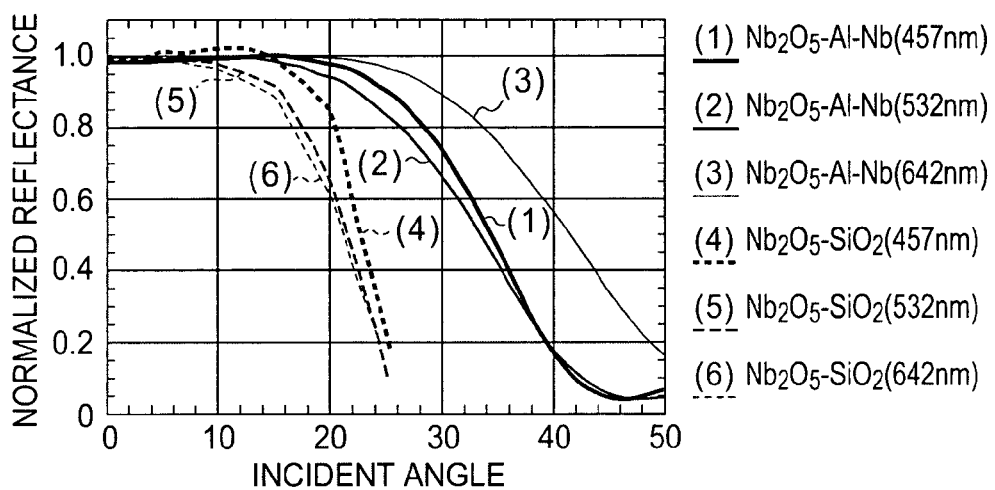
FIG. 5 is a diagram showing the incident angle dependency of a reflectance in the three primary-color wavelength regions with respect to the selectively reflective layer.

As can be seen from FIGS. 4 and 5, the selectively reflective layer 2 in the present embodiment is small in the thickness dependency and hence small in the incident angle dependency, as compared to those in the comparative example, and therefore large viewing angle characteristics can be obtained.

Figure 6:
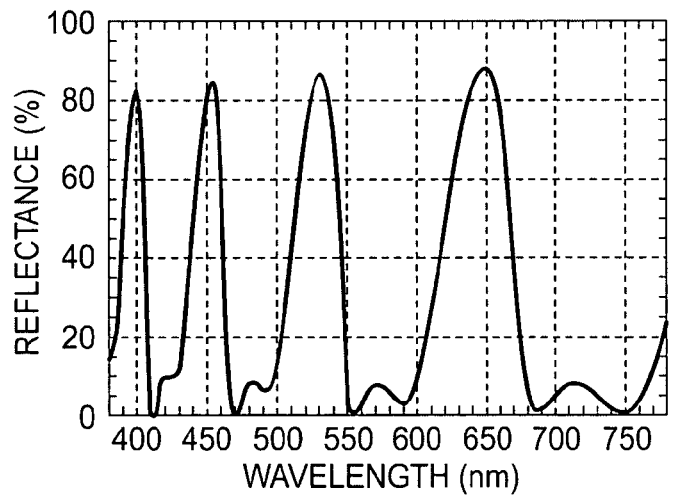
FIG. 6 is a diagram showing the reflection properties of a selectively reflective layer including Al/$Nb_2O_5$ (534 nm)/Nb (19 nm)/$Nb_2O_5$ (534 nm)

In the selectively reflective layer in the present embodiment, the minimum number of the stacked layers constituting the optical multilayer film is 2, but the number of the layers can be increased. For example, in the construction in which the optical multilayer film 4 includes three layers stacked, i.e., a dielectric film $4D_1$ including $Nb_2O_5$ having a thickness of 534 nm, a light-absorbing thin film $4M_1$ including Nb having a thickness of 19 nm, and a dielectric film $4D_2$ including $Nb_2O_5$ having a thickness of 534 nm, which films are successively stacked on the metallic film 3 including Al having a thickness of 50 nm, the selectively reflective layer has optical characteristics shown in FIG. 6. The full width at half maximum of the reflection peak in the three primary-color wavelength regions is small, as compared to that in the optical characteristics shown in FIG. 2 of the construction in which the optical multilayer film 4 includes two layers stacked, so that the black level of the screen can be further lowered.

Figure 7:
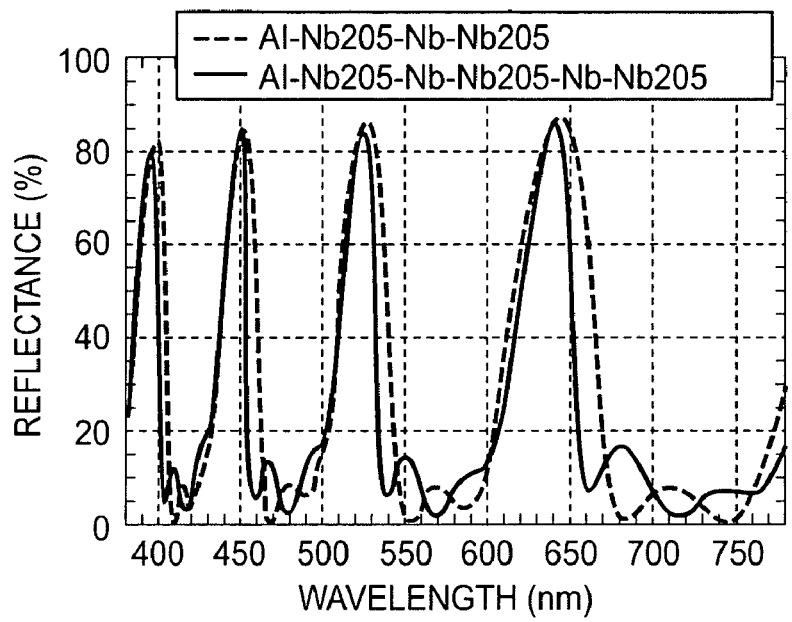
FIG. 7 is a diagram showing the reflection properties of a selectively reflective layer including Al/$Nb_2O_5$ (551 nm)/Nb (17 nm)/$Nb_2O_5$ (551 nm)/Nb (13 nm)/$Nb_2O_5$ (551 nm)

Further, for example, in the construction in which the optical multilayer film 4 includes five layers stacked, i.e., a dielectric film $4D_1$ including $Nb_2O_5$ having a thickness of 551 nm, a light-absorbing thin film $4M_1$ including Nb having a thickness of 17 nm, a dielectric film $4D_2$ including $Nb_2O_5$ having a thickness of 551 nm, a light-absorbing thin film $4M_2$ including Nb having a thickness of 13 nm, and a dielectric film $4D_3$ including $Nb_2O_5$ having a thickness of 551 nm, which films are successively stacked on the metallic film 3 including Al having a thickness of 50 nm, as shown in FIG. 7, the full width at half maximum of the reflection peak in the three primary-color wavelength regions is further small, as compared to that of the construction in which the optical multilayer film 4 includes three layers stacked. Thus, the larger the number of the stacked layers constituting the optical multilayer film 4, the smaller the full width at half maximum of the reflection peak in the three primary-color wavelength regions.

Figure 8:
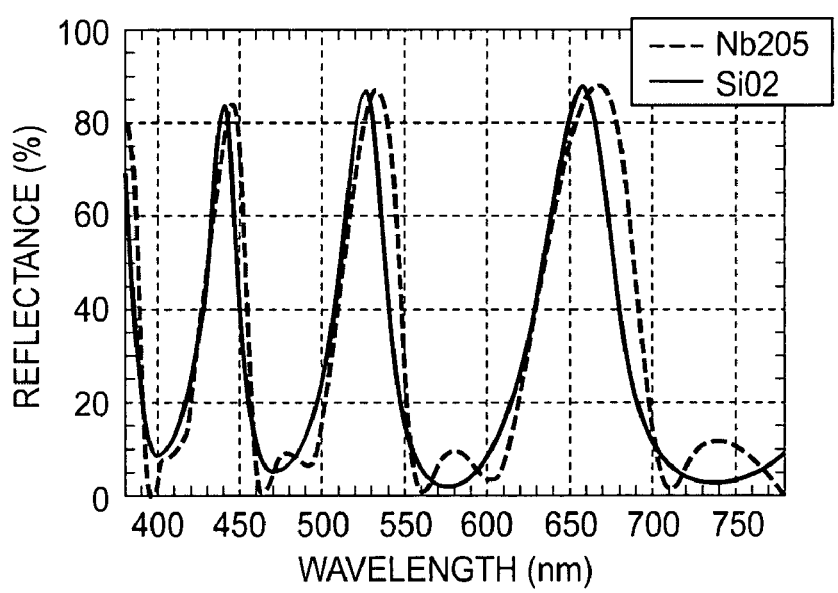
FIG. 8 is a diagram showing a comparison in reflection properties between the selectively reflective layer including Al—$Nb_2O_5$—Nb—$Nb_2O_5$ and the selectively reflective layer including Al—$SiO_2$—Nb—$SiO_2$.

The full width at half maximum of the reflection peak in the three primary-color wavelength regions also varies depending on the refractive index of the dielectric film $4D_i$. FIG. 8 shows the optical characteristics of the selectively reflective layer 2 including the optical multilayer film 4 having a three-layer structure formed on the metallic film 3 having Al, in which $Nb_2O_5$ (refractive index: 2.4) is used in the dielectric films $4D_1$, $4D_2$ (Al—$Nb_2O_5$—Nb—$Nb_2O_5$), or $SiO_2$ (refractive index: 1.46) is used in the dielectric films $4D_1$, $4D_2$ (Al—$SiO_2$—Nb—$SiO_2$), indicating a tendency that, the smaller the refractive index of the dielectric film $4D_i$, the smaller the full width at half maximum of the reflection peak in the three primary-color wavelength regions. Therefore, the dielectric material for the dielectric film $4D_i$ is appropriately selected depending on the required optical characteristics of the screen. The black level is lowered as the full width at half maximum of the reflection peak in the three primary-color wavelength regions is reduced, and the viewing angle is increased as the full width at half maximum of the reflection peak is increased.

Figure 9:
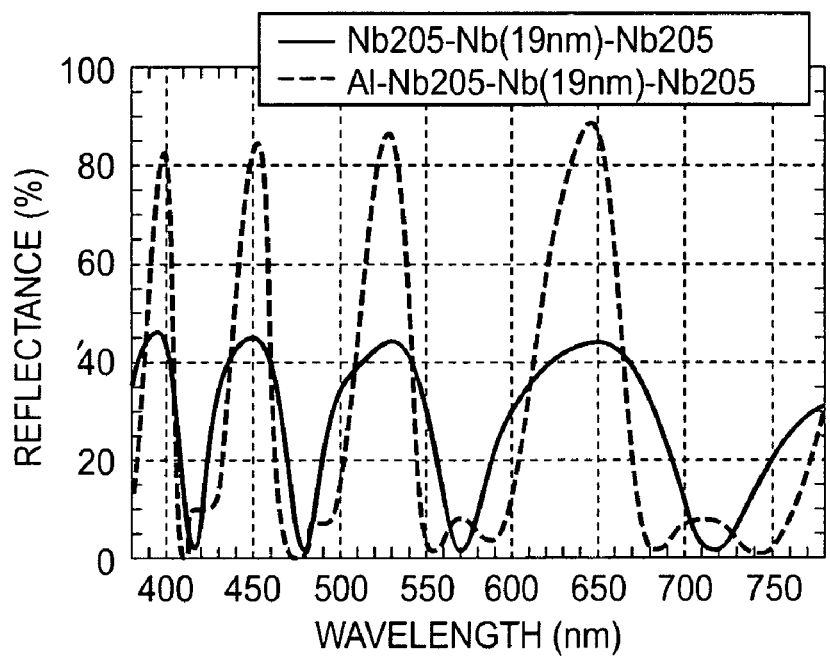
FIG. 9 is a diagram showing the reflection properties of an optical multilayer film including of $Nb_2O_5$—Nb (19 nm) —$Nb_2O_5$ and the reflection properties of a selectively reflective layer including Al—$Nb_2O_5$—Nb (19 nm) —$Nb_2O_5$.
Figure 10:
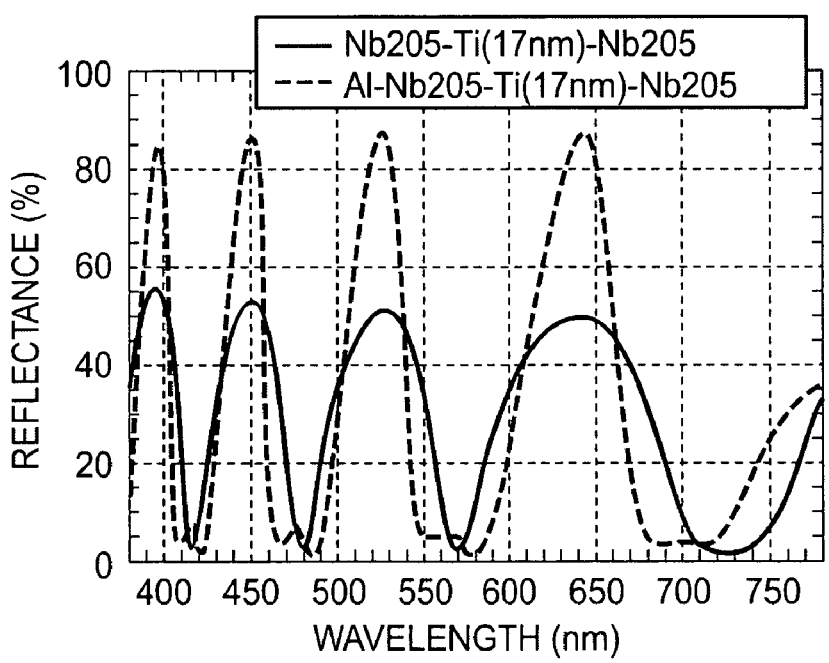
FIG. 10 is a diagram showing the reflection properties of an optical multilayer film including $Nb_2O_5$—Ti (17 nm) —$Nb_2O_5$ and the reflection properties of a selectively reflective layer including Al—$Nb_2O_5$—Ti (17 nm) —$Nb_2O_5$.
Figure 11:
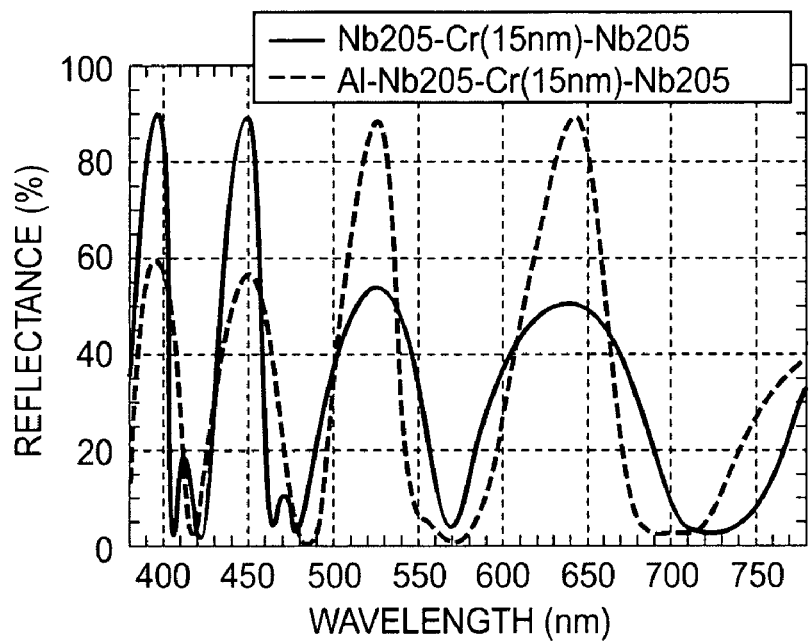
FIG. 11 is a diagram showing the reflection properties of an optical multilayer film including $Nb_2O_5$—Cr (15 nm) —$Nb_2O_5$ and the reflection properties of a selectively reflective layer including Al—$Nb_2O_5$—Cr (15 nm) —$Nb_2O_5$.
Figure 12:
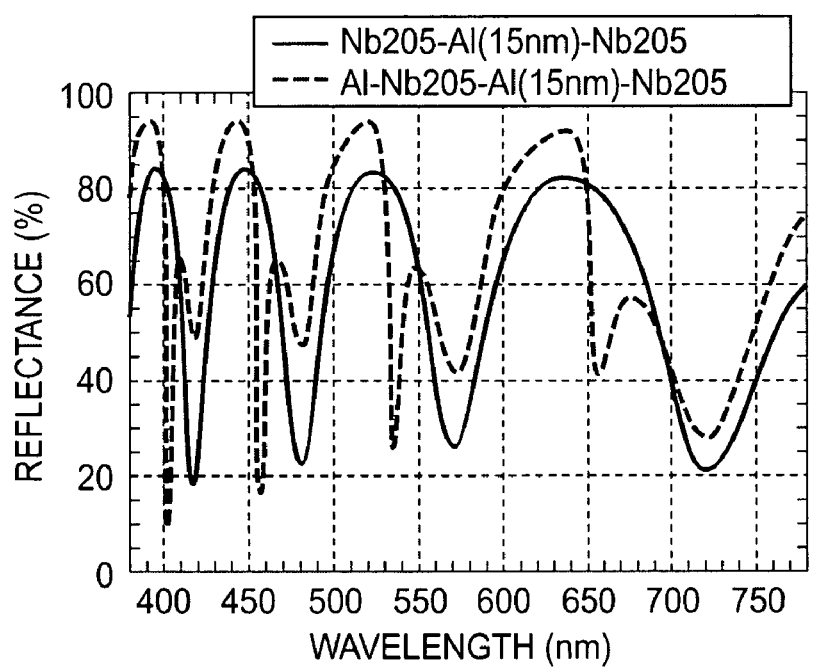
FIG. 12 is a diagram showing the reflection properties of $Nb_2O_5$—Al (15 nm) —$Nb_2O_5$ and the reflection properties of Al—$Nb_2O_5$—Al (15 nm) —$Nb_2O_5$.

The selectively reflective layer 2 includes the metallic film 3 and the optical multilayer film 4 as mentioned above, but the metallic film 3 reflects light which has passed through the optical multilayer film 4, and hence the optical characteristics of the selectively reflective layer 2 depend on the optical multilayer film 4. FIGS. 9 to 10 are diagrams of reflection spectra showing the optical characteristics of the selectively reflective layer including solely the optical multilayer film 4 without the metallic film 3 (indicated by curved solid lines in the figures) and the optical characteristics of the selectively reflective layer including the optical multilayer film and the metallic film 3 including Al (indicated by dotted lines in the figures). The optical multilayer film 4 has a three-layer structure in which each of the dielectric films $4D_1$, $4D_2$ includes $Nb_2O_5$, and the light-absorbing thin film $4M_1$ between the dielectric films $4D_1$, $4D_2$ includes a Nb film having a thickness of 19 nm (FIG. 9), a Ti film having a thickness of 17 nm (FIG. 10), or a Cr film having a thickness of 15 nm (FIG. 11). By forming, on the metallic film 3, the optical multilayer film 4 which considerably lowers the reflectance in a wavelength region other than the three primary-color wavelength regions, the selectively reflective layer 2 having the optical characteristics in the present invention can be obtained. For comparison, FIG. 12 shows the optical characteristics of substantially the same selectively reflective layer except that the light-absorbing thin film $4M_1$ includes an Al film having a thickness of 15 nm. When Al is used in the light-absorbing thin film, the lower limit of the reflectance rises, which indicates that, when such an optical multilayer film is formed on the metallic film 3, the optical characteristics of the selectively reflective layer 2 expected in the present invention cannot be obtained.

Figure 13:
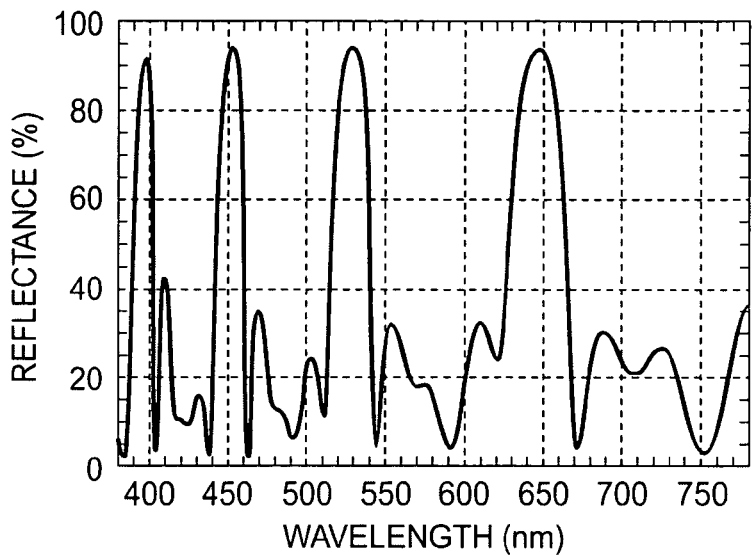
FIG. 13 is a diagram showing the reflection properties of a selectively reflective layer including Al/$Nb_2O_5$ (534 nm)/Nb (19 nm)/$Nb_2O_5$ (538 nm)/$SiO_2$ (988 nm)/$Nb_2O_5$ (518 nm)

The optical multilayer film 4 is not limited to one obtained by alternately stacking the dielectric film $4D_1$ and the light-absorbing thin film $4M_j$. For example, in the construction in which the optical multilayer film 4 includes a dielectric film $4D_2$ including $Nb_2O_5$ (thickness: 538 nm), a dielectric film $4D_3$ including $SiO_2$ (thickness: 988 nm), and a dielectric film $4D_4$ including $Nb_2O_5$ (thickness: 518 nm), which films are successively stacked on a two-layer structure including a dielectric film $4D_1$ including $Nb_2O_5$ (thickness: 534 nm) and a light-absorbing thin film $4M_1$ including Nb (thickness: 19 nm) on the metallic film 3 including Al (thickness: 50 nm), the selectively reflective layer has optical characteristics shown in FIG. 13. In this design of the optical multilayer film 4, the in the three primary-color wavelength regions is higher than that in the design of the optical characteristics shown in FIG. 6, and thus the white level of the screen can be further increased. This is effective when the power of the light source of a projector is low.

Figure 14:
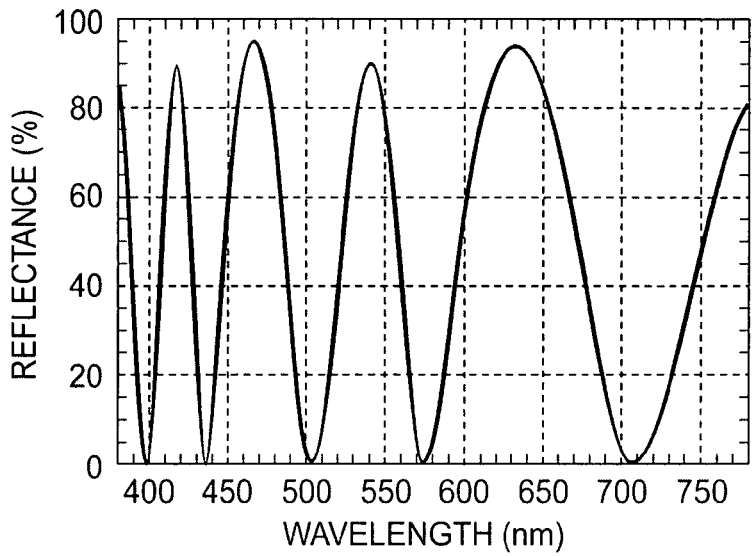
FIG. 14 is a diagram showing the reflection properties of a selectively reflective layer including Al/$SiO_2$ (554 nm)/$Nb_2O_5$ (327 nm)/Nb (6 nm)

As still another example of the design of the optical multilayer film 4, there can be mentioned a design such that the reflection intensities of the selectively reflective layer 2 in the respective wavelength regions of RGB are different for dealing with the light source of a projector having different intensities in the respective wavelength regions of RGB. For example, in the construction in which the optical multilayer film 4 includes a dielectric film $4D_1$ including $SiO_2$ (thickness: 554 nm), a dielectric film $4D_2$ including $Nb_2O_5$ (thickness: 327 nm), and a light-absorbing thin film $4M_1$ including Nb (thickness: 6 nm), which films are successively stacked on the metallic film 3 including Al (thickness: 50 nm), the selectively reflective layer has optical characteristics shown in FIG. 14. In this design, the reflectance in the wavelength region of green light (G) is lowered, as compared to that in the wavelength region of blue light (B) or red light (R).

Figure 15:
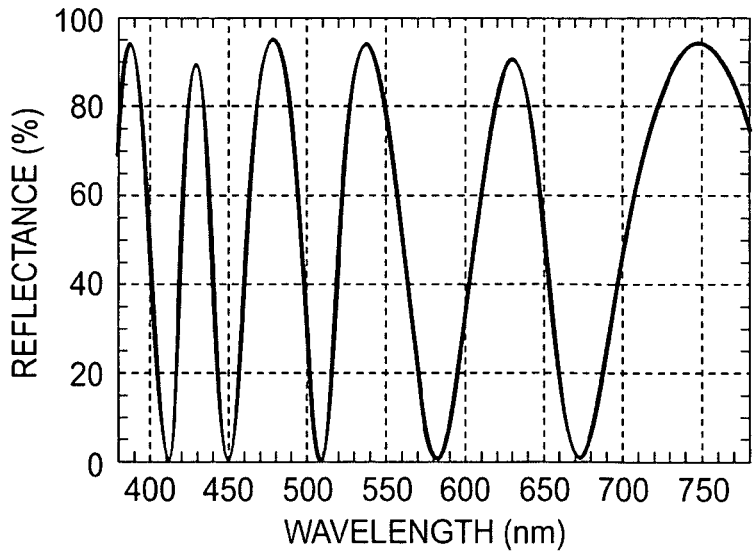
FIG. 15 is a diagram showing the reflection properties of a selectively reflective layer including Al/$SiO_2$ (429 nm)/$Al_2O_3$ (392 nm)/$Nb_2O_5$ (254 nm)/Nb (6 nm)

Further, for example, in the construction in which the optical multilayer film 4 includes a dielectric film $4D_1$ including $SiO_2$ (thickness: 429 nm), a dielectric film $4D_2$ including $Al_2O_3$ (thickness: 392 nm), a dielectric film $4D_3$ including $Nb_2O_5$ (thickness: 254 nm), and a light-absorbing thin film $4M_1$ including Nb (thickness: 6 nm), which films are successively stacked on the metallic film 3 including Al (thickness: 50 nm), the selectively reflective layer has optical characteristics shown in FIG. 15. In this design, the reflectance in the wavelength region of red light (R) is lowered, as compared to that in the wavelength region of blue light (B) or green light (G).

By designing the structure and thickness of the films constituting the selectively reflective layer 2 so that the specific reflection region includes the three primary-color wavelength regions, the reflection intensities can be individually controlled. The selectively reflective layer 2 having the above-mentioned construction is advantageously used for a light source having sharp bright line peaks in the three primary-color wavelength regions, such as a laser projector or a light emitting diode (LED) projector using a GLV.

In a xenon light source for an SXRD or the like, or a high-pressure mercury lamp (UHP) light source for a liquid crystal projector or the like, which light source has a spectrum all over the visible light region, even when the reflection peak is adjusted to be in the three primary-color wavelength regions by designing the thickness of the films constituting the selectively reflective layer 2 as mentioned above, a remarkable improvement of the contrast cannot be achieved. Therefore, in this case, it is preferred that the selectively reflective layer 2 is designed so that it selectively absorbs the bright line peak of ambient light, especially light from a fluorescent light.

Specifically, the selectively reflective layer 2 shown in FIG. 1, including the metallic film 3 and the optical multilayer film 4 having at least the dielectric film $4D_1$ and the light-absorbing thin film $4M_1$ having transmission properties, is designed according to the wavelength spectrum of ambient light so that the layer absorbs mainly the ambient light from a fluorescent light or the like and reflects light in the other wavelength region.

Further, in the selectively reflective layer 2, the optical multilayer film may be designed so that the selectively reflective layer has high absorption properties with respect to the bright line spectrum of ambient light from a fluorescent light or the like such that the absorption is, e.g., 70% or more and high reflection properties with respect to light in a wavelength region other than the wavelength region of the ambient light such that the reflectance is, e.g., 70% or more. Specifically, the optical multilayer film is designed so that the wavelength region in which the selectively reflective layer 2 exhibits absorption properties includes the wavelength of a bright line peak of ambient light from a fluorescent light or the like.

Figure 16A:
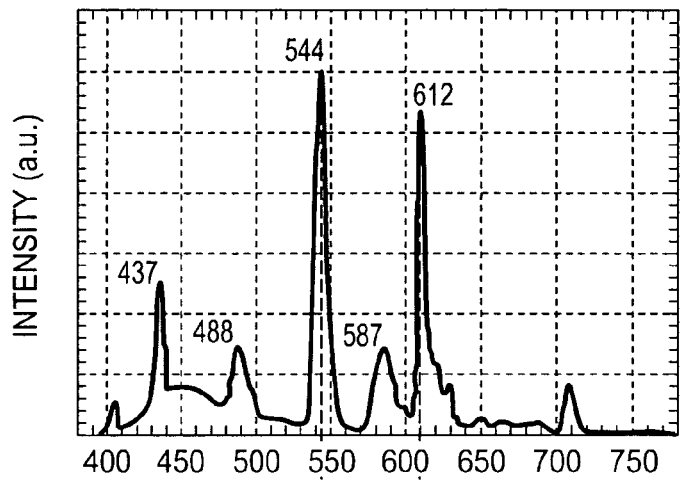
FIG. 16 is a diagram showing the bright line spectrum of a fluorescent light and the reflection properties of a selectively reflective layer including Al/$Nb_2O_5$ (975 nm)/Nb (12 nm)
Figure 16B:
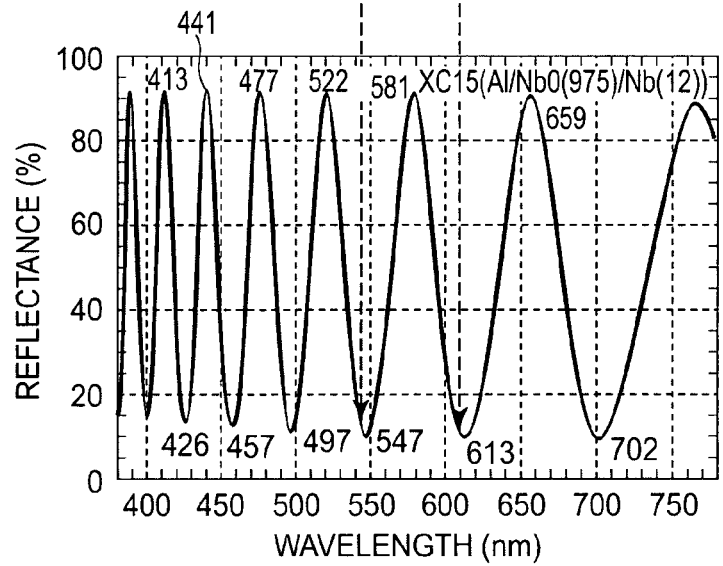

For example, in the construction in which the optical multilayer film 4 includes a dielectric film $4D_1$ including $Nb_2O_5$ and a light-absorbing thin film $4M_1$ including Nb, which are successively stacked on the metallic film 3 including Al, the selectively reflective layer 2 having optical characteristics shown in FIG. 16(B) can be obtained by appropriately designing the optical multilayer film. This design is made so that the selectively reflective layer has an absorption as high as, e.g., 80% or more in the region of the bright line spectrum of a fluorescent light and a reflectance as high as, e.g., 80% or more with respect to light in a wavelength region other than the above wavelength region, and the Al film (metallic film 3) has a thickness of 50 nm, the $Nb_2O_5$ film (dielectric film $4D_1$) has a thickness of 975 nm, and the Nb film (light-absorbing thin film $4M_1$) has a thickness of 12 nm. Here, the design is made taking as an example the case where wavelengths of the bright line peak of a fluorescent light are 544 nm and 612 nm (FIG. 16(A)). When, for example, about 50 nm of $SiO_2$ is formed as a barrier film for the Nb film, it does not largely affect the optical characteristics.

Alternatively, when the ambient light is a light such as a light from a halogen lamp, it is preferred that the selectively reflective layer 2 is designed so that wavelength regions having absorption properties are arranged at the regions between the wavelength of the bright line peak of red component of the possible light source and that of the bright line peak of the green component thereof, and between the wavelength of the bright line peak of the green component and that of the bright line peak of the blue component.

Figure 17:
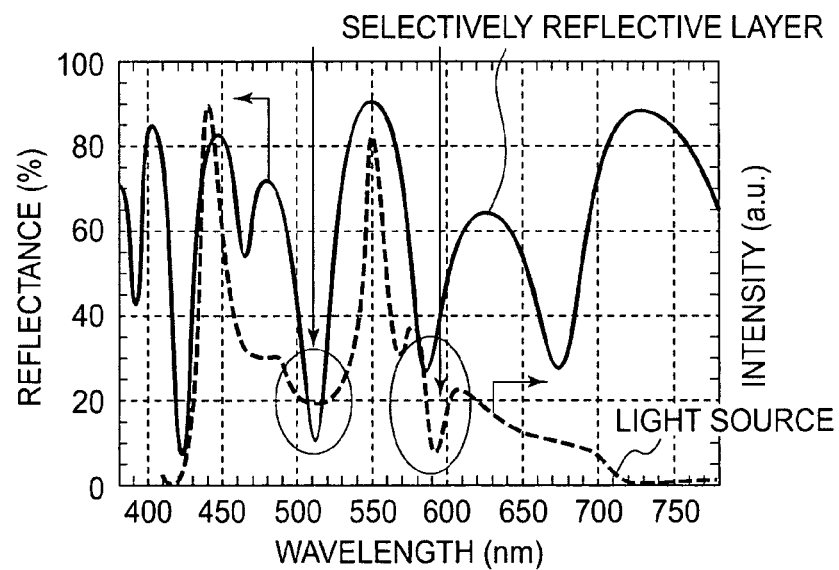
FIG. 17 is a diagram showing the reflection properties of a selectively reflective layer including Al (100 nm)/$Nb_2O_5$ (450 nm)/Nb (3 nm)/$Nb_2O_5$ (330 nm) and the bright line spectrum of a light source.

This example is shown in FIG. 17. In this example, as the construction is employed in which the selectively reflective layer 2 includes an optical multilayer film 4 including a dielectric film 4D1 made of $Nb_2O_5$ (450 nm thick), a light-absorbing thin film 4M1 made of Nb (3 nm thick), and a dielectric film 4D2 made of $Nb_2O_5$ (330 nm thick), which are successively stacked on the metallic film 3 made of Al (100 nm thick), the selectively reflective layer 2 has absorption properties in which wavelength regions of absorption (absorption peak) reside between a bright line peak of 440 nm wavelength and a bright line peak of 550 nm wavelength, and between a bright line peak of 550 nm wavelength and a right line peak of 610 nm wavelength, or more particularly, between a 570 nm wavelength and a 600 nm wavelength, and between a 500 nm wavelength and a 530 nm wavelength, among the bright line peaks of the light source of a UHP lamp.

The selectively reflective layer 2 having above construction has high reflection properties with respect to the projector light and high absorption properties with respect to ambient light from a fluorescent light or the like, and therefore the black level of the screen can be lowered while keeping the white level high even in an environment at a high ambient light level.

The improvement of the contrast by the present invention is shown in Table 1. The table shows the results of the measurement of a reflection luminance, using a xenon lamp as a projector light source and a fluorescent light, with respect to the reflective layer, i.e., each of a selectively reflective layer (Al film (metallic film 3) thickness 50 nm/$Nb_2O_5$ film (dielectric film $4D_1$) thickness 975 nm/Nb film (light-absorbing thin film $4M_1$) thickness 12 nm) and an Al film. The contrast is determined by dividing the sum of a reflection luminance of the projector light source and a reflection luminance of the fluorescent light by the reflection luminance of the fluorescent light. The selectively reflective layer in the present invention is improved in contrast, as compared to the Al film which reflects light from the projector light source and light from the fluorescent light at the same rate, indicating that, in the selectively reflective layer in the present invention, the rate of absorption of light from the fluorescent light is higher than the rate of absorption of light from the projector light source.

TABLE 1

| Reflective layer | Al/$Nb_2O_5$/Nb | Al |
| --- | --- | --- |
| Reflection luminance (nit) for projector light source | 464 | 957 |
| Reflection luminance (nit) for fluorescent light | 11 | 47 |
| Contrast | 43.2 | 21.4 |

From the viewpoint of improving the contrast, it is preferred that the surface of the substrate 1 on which the selectively reflective layer 2 is formed is a flat surface with surface roughness as small as possible as long as no problem is caused in bonding of the selectively reflective layer 2 to the substrate or traveling of the film during the formation.

The effect of the surface roughness of the substrate 1 on the contrast is shown in Table 2. The table shows the results of the measurement of a reflection luminance, using a xenon lamp as a projector light source and a fluorescent light, with respect to each of a sample A obtained by forming a selectively reflective layer (Al film (metallic film 3) thickness: 50 nm/$Nb_2O_5$ film (dielectric film $4D_1$) thickness: 975 nm/Nb film (light-absorbing thin film $4M_1$) thickness: 12 nm) on a commercially available PEN film (thickness: 100 μm; substrate 1A) as the substrate 1, and a sample B obtained by forming a binder layer having fine particles dispersed therein on the surface of the PEN film as a substrate 1, and then forming a selectively reflective layer having the same construction as that in the sample A on the surface of the substrate 1. With respect to the substrate for the sample A (a commercially available PEN film) and the substrate for the sample B (a PEN film obtained by forming a binder layer having fine particles dispersed therein on the surface of the PEN film) before forming the selectively reflective layer, and the samples A and B, a piece having a 5 mm square surface was cut out, and surface roughness of a region of 10 μm square on the surface was measured using a scanning probe microscope (SPM; Nanoscope4, manufactured and sold by Digital Instruments). As a result, the substrate for the sample A had a center line average roughness ($R_a$) of 1.4 nm and a maximum height ($R_{max}$) of 45 nm, the substrate for the sample B had an $R_a$ of 6.3 nm and an $R_{max}$ of 198 nm, the sample A had an $R_a$ of 4.2 nm and an $R_{max}$ of 44 nm, and the sample B had an $R_a$ of 12.1 nm and an $R_{max}$ of 233 nm. Further, in each of the samples A and B, no problem was caused in bonding of the selectively reflective layer 2 to the substrate 1.

TABLE 2

| | Sample A | Sample B |
| --- | --- | --- |
| Reflection luminance (nit) for projector light source | 555 | 533 (−5%) |
| Reflection luminance (nit) for fluorescent light | 23.9 | 25.1 (+5%) |
| Contrast | 24.2 | 22.2 (−10%) |

As can be seen from Table 2, in the sample A having smaller surface roughness of the substrate, diffusion of the reflected light of the projector light is suppressed, and the reflection luminance for the projector light is higher than that of the sample B, and diffusion of the reflected light of light from a fluorescent light is suppressed to lower the black level, so that the sample A is improved in contrast, as compared to the sample B.

Figure 18:
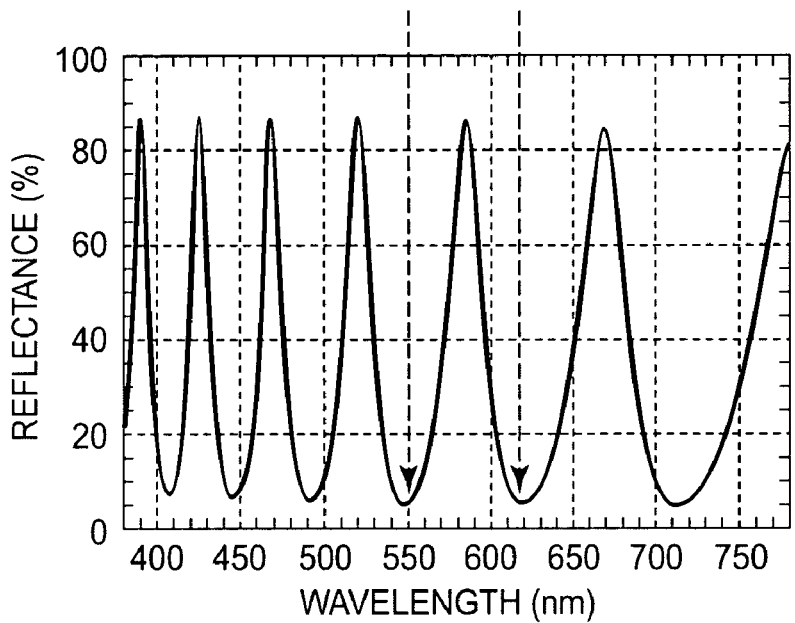
FIG. 18 is a diagram showing the reflection properties of a selectively reflective layer including Al/resin film (refractive index: 1.68; 1,372 nm)/Nb (12 nm)

In another example of the construction of the selectively reflective layer 2 which selectively absorbs the bright line peak of light from a fluorescent light, the constituent material for the dielectric film $4D_1$ in the films constituting the optical multilayer film 4 may be, instead of $Nb_2O_5$, a transparent resin formed by a wet process. The optical characteristics are shown in FIG. 18. Also in this case, the optical multilayer film is designed so that the selectively reflective layer has an absorption as high as, e.g., 80% or more in the region of the bright line spectrum of a fluorescent light and a reflectance as high as, e.g., 80% or more with respect to light in a wavelength region other than the above wavelength region, and the Al film (metallic film 3) has a thickness of 50 nm, the resin film (dielectric film $4D_1$) formed by applying a thermosetting resin Opstar, manufactured and sold by JSR Corporation, (JN7102; refractive index: 1.68) has a thickness of 1,372 nm, and the Nb film (light-absorbing thin film $4M_1$) has a thickness of 12 nm.

The improvement of the contrast in a case that the light from a halogen lamp is an ambient light, is shown in Table 1. The table shows the results of the measurement of a reflection luminance, using a UHP lamp and a halogen lamp as a projector light source, with respect to the reflective layer, i.e., each of a selectively reflective layer (Al film (metallic film 3) thickness 100 nm/$Nb_2O_5$ film (dielectric film $4D_1$) thickness 450 nm/Nb film (light-absorbing thin film $4M_1$) thickness 3 nm/$Nb_2O_5$ film (dielectric film $4D_2$) thickness 330), and an Al film. The selectively reflective layer in the present invention is improved in contrast, as compared to the Al film which reflects light from the projector light source and light from the halogen lamp at the same rate, indicating that, in the selectively reflective layer in the present invention, the rate of absorption of light from the halogen light is higher than the rate of absorption of light from the projector light source.

TABLE 3

| Reflective layer | Al/$Nb_2O_5$/Nb/$Nb_2O_5$ | Al |
|---|---|---|
| Reflection luminance (nit) for projector light source | 614 | 794 |
| Reflection luminance (nit) for halogen lamp | 5.9 | 11.4 |
| Contrast | 105.1 | 70.6 |

The diffusion layer 5 formed on the selectively reflective layer 2 is a diffuser panel having, for example, microlens array (MLA) formed thereon, and has flexibility. At the diffusion layer 5, the light in three primary-color wavelength regions reflected by the selectively reflective layer 2 is scattered, so that the viewing angle is increased, thus obtaining excellent viewing characteristics. Alternatively, the diffusion layer 5 may include a plurality of spherical beads having a diameter of, e.g., several μm to several mm wherein the beads are arranged at equal intervals. The beads include a transparent material, such as glass or a polymer material. Alternatively, the diffusion layer 5 may include metal fine particles of silver (Ag), copper (Cu), or the like dispersed in a predetermined medium. Further alternatively, the diffusion layer 5 may be a diffuser panel having formed a fine and random uneven surface.

Further, it is preferred that the diffusion layer 5 has characteristics such that outgoing light therefrom is in a predetermined objective range, that is, the diffusion layer has an light diffusion surface which has optical anisotropic characteristics that the light diffusion angles differs in a vertical direction and a horizontal direction. It is preferred that the vertical light diffusion angle is about 20 degrees in a full width at half maximum of the luminance, and the horizontal light diffusion angle is about 40 degrees in a full width at half maximum of the luminance. By employing this design, a screen having a good visibility can be obtained, controlling the light emitting from the screen to direct in the field of view. The effect of the ambient light can be lowered, the incident angle of which differs from that of the projection light from the projector onto the screen, by controlling the vertical diffusion angle in a range where a viewer does not feel odd. Therefore, the contrast of the displayed image can be increased.

Further, it is preferred that the diffusion layer 5 has an deviant axis of the maximum luminance with respect to light diffused therefrom when an angle dependency of the diffused light is measured by projecting a light on it with an incident angle of 0 degree, in either one of or both of the vertical direction or the horizontal direction. Namely, the axis of the maximum luminance is inclined to the normal of the diffusion layer 5 when an angle dependency of the diffused light is measured by projecting a light on it with an incident angle of 0 degree, in either one of or both of the vertical direction or the horizontal direction, and the luminance distribution of the diffused light is preferably asymmetrical with respect to the axis of the maximum luminance.

Therefore, controlling the light emitting from the screen to direct in an objective field of view at anywhere in the screen, it is possible to obtain high and uniform luminance and gain, and accordingly to provide a screen with high visibility.

These characteristics can be achieved by providing the diffusion surface with fine surface elements having a protruding or depressed form asymmetrical with respect to the normal of the diffusion layer 5. In particular, the light diffusion surface can be obtained by transferring the surface form of a metal dye, which surface is formed by a sandblast treatment with a blowing angle of the abrasive material to the dye less than 90 degrees.

The screen according to the present embodiment can be manufactured as follows. Here, an explanation is made on the example in which the number of the stacked layers constituting the optical multilayer film 4 is 2. A metallic film 3, a dielectric film $4D_1$, and a light-absorbing thin film $4M_1$ having transmission properties are successively stacked on a substrate 1 including a plastic having a thickness of, for example, 100 μm using, e.g., a sputtering method to form a selectively reflective layer 2. In this case, the thickness of the metallic film 3 is 50 nm or more, and the optical multilayer film 4 is designed so that the selectively reflective layer including the optical multilayer film 4 formed on the metallic film 3 has high reflection properties with respect to light in wavelength regions of the three primary colors, i.e., red light, green light, and blue light and high absorption properties with respect to light in a wavelength region other than the three primary-color wavelength regions. Finally, for example, a diffuser panel as a diffusion layer 5 is stacked on the optical multilayer film 4 to obtain a screen having flexibility.

The dielectric film $4D_1$ may be formed by a wet process such that a liquid resin is applied and cured to form a film.

The screen including the selectively reflective layer having the above-mentioned optical characteristics is used as a screen for front type projector. Examples of projectors include laser projectors and LED projectors using a GLV, but the projector is not limited to the projector having, as a light source, a laser generator or a light emitting diode (LED), which emits narrow-band light of the three primary colors, and the screen is used in a projector having a light source, such as a metal halide lamp, a high-pressure mercury lamp, or a xenon lamp.

As mentioned above, in the present embodiment, by forming the optical multilayer film including the dielectric film and the light-absorbing thin film having transmission properties on the metallic film, a screen having high reflection properties with respect to light in, for example, wavelength regions of three primary colors and having high absorption properties with respect to light in the other wavelength region can be obtained, that is, a screen having high white level and low black level, namely, having high luminance and high contrast can be achieved.

The optical multilayer film including the dielectric film and the light-absorbing thin film having transmission properties is small in the thickness dependency and small in the incident angle dependency of the reflectance, as compared to the optical multilayer film obtained by alternately stacking a high refractive-index layer and a low refractive-index layer. Therefore, a large viewing angle can be obtained, so that not only can the size of the screen be increased, but also the margin of production can be increased, thus improving the productivity.

By appropriately selecting the refractive index of the dielectric film or the number of the stacked layers in the optical multilayer film, the full width at half maximum of a reflection peak in, e.g., three primary-color wavelength regions can be controlled to be small or large, and therefore a screen having high quality of image such that both the contrast and the viewing angle are excellent can be obtained according to the light source of a projector.

By appropriately designing the optical multilayer film, the reflectance with respect to light in the three primary-color wavelength regions can be controlled to be high or low, and therefore a screen having high contrast can be obtained according to the power of the light source of a projector.

By appropriately designing the optical multilayer film, the reflectances in the respective wavelength regions of RGB can be individually controlled, and therefore a screen capable of adjusting the color of an image according to the intensity of the light source of a projector in the respective wavelength regions of RGB can be obtained.

By appropriately designing the optical multilayer film, the wavelength region in which the selectively reflective layer exhibits absorption properties can be controlled so that the wavelength region in which the selectively reflective layer exhibits absorption properties includes the wavelength of a bright line peak of ambient light, thus obtaining a screen having high contrast.

Further, in the present embodiment, an arbitrary material can be used in the substrate according to the way of using the screen, and, when a substrate having flexibility is used, a screen having flexibility can be obtained due to the small thickness of each of the metallic film and the optical multilayer film in the selectively reflective layer.

Figure 19:
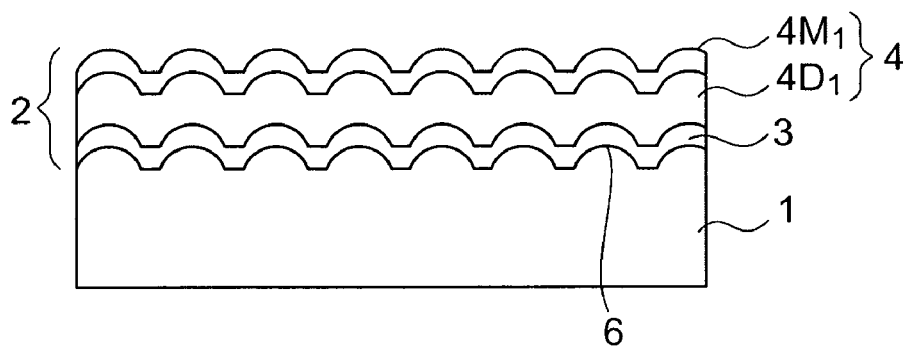
FIG. 19 is a cross-sectional view of an example of a variation on the first embodiment.

In the present embodiment, as shown in FIG. 1, the diffusion layer 5 is formed on the selectively reflective layer 2, and, as an example of a variation on the present embodiment, a construction shown in FIG. 19 may be employed in which a number of protruding portions 6 (or depressed portions) are formed on the surface of a substrate 1, and a selectively reflective layer 2 having a form according to the form of the surface of the substrate 1 is formed on the protruding or depressed portions. In this construction, light scattering can be controlled by adjusting the form of the protruding portions 6 (or depressed portions), and hence the diffusion layer 5 is not needed, so that not only can the thickness of the screen be further reduced, but also the cost can be lowered.

Next, a screen according to the second embodiment of the present invention will be described with reference to FIG. 20. In the second embodiment and the first embodiment, like parts or portions are indicated by like reference numerals, and the overlapping description is omitted.

Figure 20:
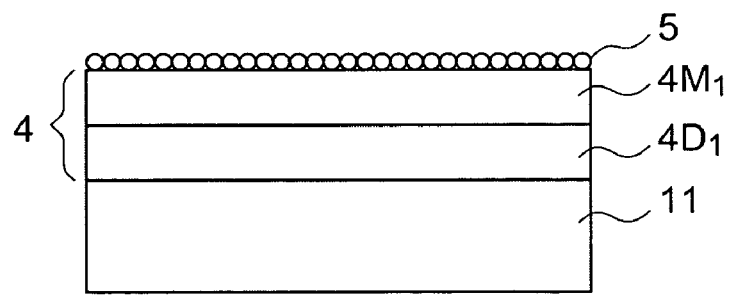
FIG. 20 is a cross-sectional view of a screen according to the second embodiment of the present invention.

In FIG. 20, the screen according to the present embodiment includes an optical multilayer film 4 having at least a dielectric film $4D_1$ and a light-absorbing thin film $4M_1$ having transmission properties formed on a metallic substrate 11, and a diffusion layer 5 formed on the optical multilayer film 4. Compared to the first embodiment shown in FIG. 1, the metallic film 3 is omitted.

In this construction, a material used for the metallic substrate 11 is similar to that used for the metallic film 3. By forming directly on the metallic substrate 11 the optical multilayer film 4 including a dielectric film $4D_i$ (i=1, 2, . . . ) and a light-absorbing thin film $4M_j$ (j=1, 2, . . . ), a selectively reflective layer 2 having optical characteristics similar to those in the first embodiment can be obtained. In this case, the design of the optical multilayer film 4 is similar to that in the first embodiment.

The screen can be manufactured as follows. In an example in which the optical multilayer film 4 has a two-layer structure, the dielectric film $4D_1$ and the light-absorbing thin film $4M_1$ are successively stacked on the metallic substrate 11 having a thickness of, for example, several tens μm using, e.g., a sputtering method. By forming the dielectric film $4D_1$ and light-absorbing thin film $4M_1$ on the metallic substrate 11, the optical multilayer film is designed so that the selectively reflective layer has high reflection properties with respect to light in wavelength regions of the three primary colors, i.e., red light, green light, and blue light and high absorption properties with respect to light in a wavelength region other than the three primary-color wavelength regions. Finally, for example, a diffuser panel is stacked on the optical multilayer film 4 to form a diffusion layer 5, thus completing a screen.

In the second embodiment, a screen having optical characteristics similar to those in the first embodiment can be obtained, that is, a screen having high luminance and high contrast such that a sharp image is achieved in the bright light can be obtained. Further, in the present embodiment, the use of the metallic substrate makes unnecessary formation of a metallic film, and therefore, not only can the construction of the screen be further simplified, but also the production for the screen is easier.

As an example of a variation on the present embodiment, a construction may be employed in which, instead of the diffusion layer 5, a number of protruding portions (or depressed portions) are formed on the surface of the metallic substrate 11 and an optical multilayer film 4 having a form according to the form of the surface of the substrate is formed on the protruding or depressed portions.

Next, a screen according to the third embodiment of the present invention will be described with reference to FIG. 21. In the third embodiment and the first and second embodiments, like parts or portions are indicated by like reference numerals, and the overlapping description is omitted.

Figure 21:
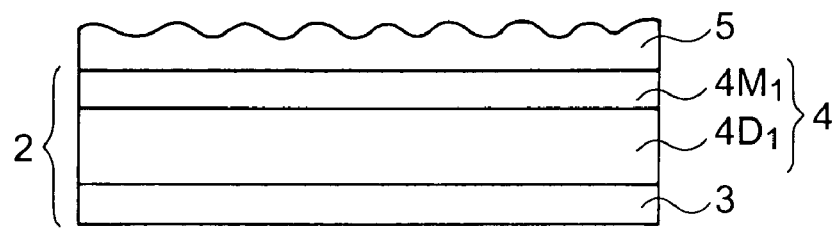
FIG. 21 is a cross-sectional view of a screen according to the third embodiment of the present invention.

In FIG. 21, the screen according to the present embodiment includes a selectively reflective layer 2 having a metallic film 3 and an optical multilayer film 4, and a diffusion layer 5.

For example, when the optical multilayer film 4 has a two-layer structure, the screen having the above construction can be obtained by forming, on the back surface of a diffuser panel as the diffusion layer 5, first a light-absorbing thin film $4M_1$ and then a dielectric film $4D_1$, and finally the metallic film 3 by, e.g., a sputtering method in the order opposite to the order of formation of the multilayer film on the substrate 1 in the first embodiment. The design of the optical multilayer film 4 including a dielectric film $4D_i$ (i=1, 2, ...) and a light-absorbing thin film $4M_j$ (j=1, 2, ...) is similar to that in the first embodiment.

In the present embodiment, a screen having performance equivalent to that in the first embodiment can be manufactured without a substrate, that is, not only can a screen having flexibility be easily obtained, but also the cost for production can be reduced.

Figure 22:
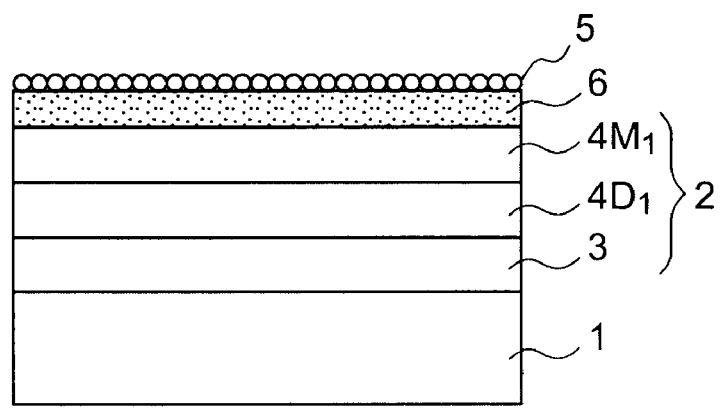
FIG. 22 is a cross-sectional view of a screen according to the fourth embodiment of the present invention.

Next, a screen according to the fourth embodiment of the present invention will be described with reference to FIG. 22. In the fourth embodiment, a screen is obtained by gluing together the selectively reflective layer 2 and the diffusion layer 5 of the screen shown in FIG. 1 by an adhesive layer 6 having the predetermined light absorption properties, and the rest of the structure is the same as that of FIG. 1.

The adhesive layer 6 has adhesive properties for bonding the selectively reflective layer 2 and the diffusion layer 5, and is a film having light absorption properties. The light absorption properties are designed to match the chromatic coordinate of a projector light source and that of displayed image on the screen. Therefore, the adhesive layer 6 is added and dispersed therein a coloring material which absorbs light in a specific wavelength region and a black pigment of carbon black.

The aforementioned coloring material absorbing light in a specific wavelength region may be either pigment or dye, and is preferably a magenta material which absorbs green light.

For such dye, a dye which has large absorption properties with respect to light in the neighborhood of 532 nm wavelength, or in particular, in the wavelength region between 525 nm and 560 nm can be used. For example, such dye is a compound of cyanine, squarium, azomethine, xanthene, oxonol, or azo. Preferably, a cyanine compound is used, and more preferably, a compound described by the following expression (A). These dyes have absorption properties which exhibit maximum absorption with respect to light between 550 nm 620 nm, that is, maximum absorption with respect to orange light region including a neon light. In the present invention, the absorption properties of the dyes with respect to green light region are utilized.

(A)

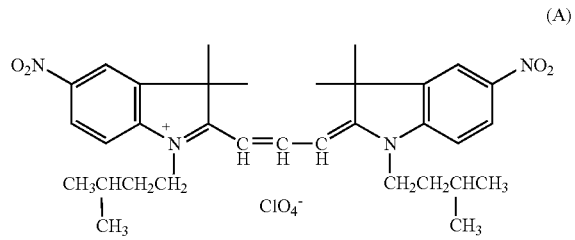

For such pigment, it is preferred to use pigment red (PR), for example, dichloroquinacridon (PR209) described by the following expression. This pigment has a wavelength where a transmittance is a minimum value (minimum transmittance wavelength) which is 540 nm with respect to light having wavelength region between 525 nm and 560 nm, and the transmittance at 540 nm is smaller than that with respect to blue or red light wave region.

As dyes having the same characteristics, diketopyrrolopyrrole (PR254) having a minimum transmittance wavelength of 544 nm, dimethylquinacridon (PR122) having a minimum transmittance wavelength of 510 nm, etc are cited.

And, as additives to the adhesive layer 2, materials which absorb green light can be employed, such as fine metal particles, fine metal-coated particles, for example, gold colloid having a minimum transmittance wavelength of 529 nm.

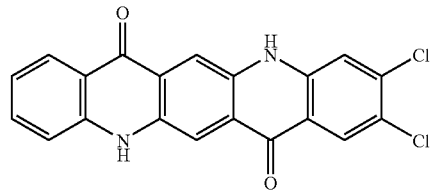

The adhesive layer 6 is so configured that the amount of pigment or dye added to the adhesive layer 6 and the thickness thereof are appropriately designed considering the transmittance with respect to objective light wavelength region.

Figure 23:
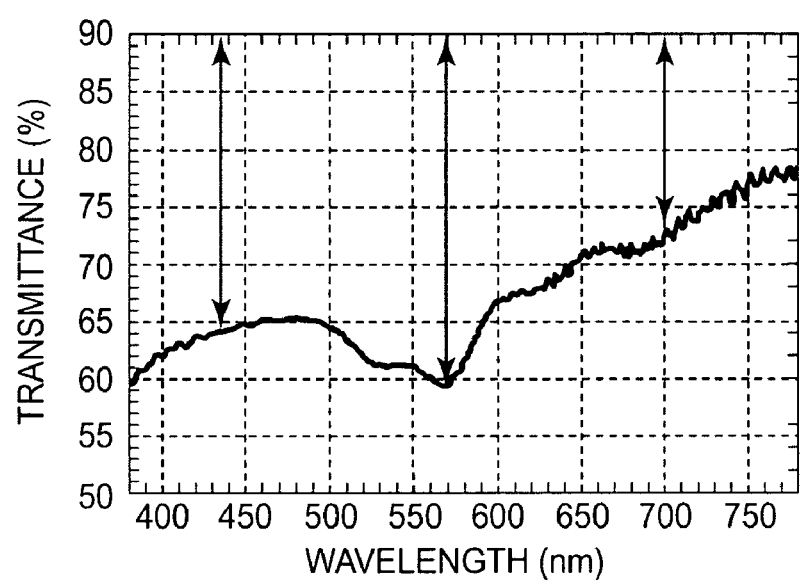
FIG. 23 is a diagram showing light transmittance properties of an adhesive layer of a screen according to an embodiment of the present invention.

In FIG. 23, there is shown an example of the light transmittance properties of the adhesive layer according to the present invention. In this example, transmittance with respect to a light having red wavelength region is the greatest. And, with respect to a light having blue wavelength region, transmittance is the next great. With respect to a green light wavelength region, transmittance is the lowest. Namely, the amount of light absorption in the respective three primary-color wavelength regions, differs each other. In FIG. 23, the amount of light absorption is indicated by arrows. With respect to the blue light wavelength, the absorption amount is about 25%, with respect to the green light wavelength the absorption is about 30%, and with respect to the red light wavelength the absorption is about 18%.

As its light absorption/transmittance properties, the adhesive layer 6 especially absorbs a light in a green wavelength region (a light in a 500-600 nm wavelength region), which is one of the plurality of lights in a specific wavelength region in which the selectively reflective layer 2 exhibits high reflection properties. And a transmittance with respect to light in a red wavelength region, which light is one of a plurality of lights in a specific wavelength region in which the selectively reflective layer 2 exhibits high reflection properties, is higher than those of light in blue or green wavelength regions. Accordingly, when a UHP lamp and so on is used as a light source, an imbalance caused by excess of spectrum intensity in a green wavelength region and shortage of spectrum intensity in a red wavelength region can be compensated by the light absorption properties of the adhesive layer 6. Therefore, an image having an excellent white balance can be displayed on the screen.

Figure 24:
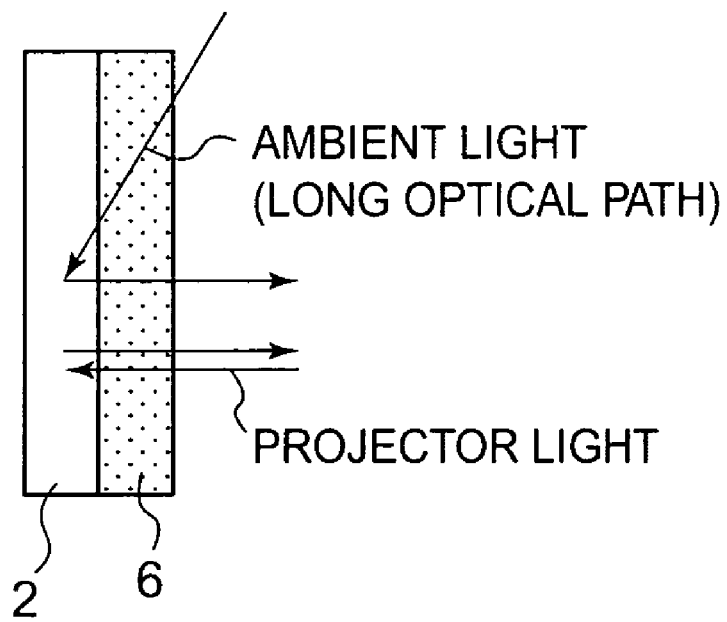
FIG. 24 is a diagram showing the incident state of a projection light and ambient light onto an adhesive layer of a screen according to an embodiment of the present invention.
Figure 25:
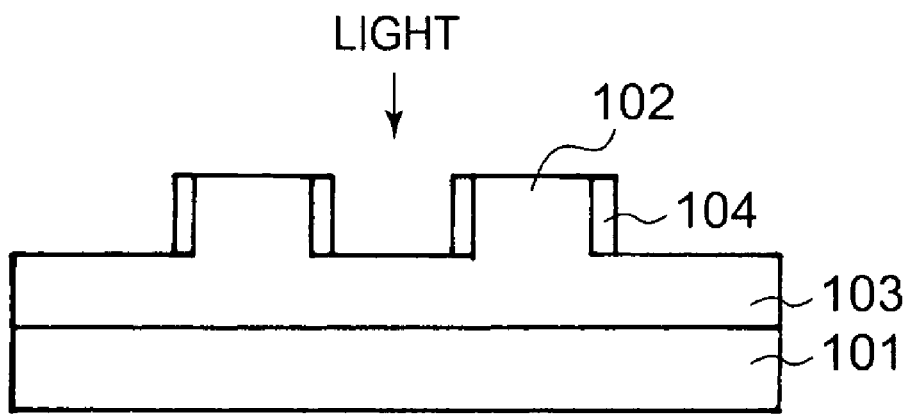
FIG. 25 is a cross-sectional view of a conventional screen.

Namely, an incident light on the screen passes through the adhesive layer 6 while a portion of the light is absorbed according to light absorption properties shown in FIG. 23, and then arrives at the selectively reflective layer 2. And, while an ambient light component of the incident light is absorbed by the selectively reflective layer 6, only a light in a specific wavelength region, e.g., RGB three primary-color wavelength regions with respect to image is selectively reflected. Then, while the reflected light passes the adhesive layer 6, the portion of the light in a specific wavelength region (a green light in case of UHP lamp) is absorbed with a light in a red wavelength region passing with a high transmittance. Therefore, the light intensity of an image is well balanced, and an image diffused on the surface of the diffusion layer 5, having a broad viewing angle is provided for the viewers. Further, as shown in FIG. 24, an ambient light is much more absorbed because it has a certain incident angle and therefore a long optical path. Accordingly, the effect of an ambient light to the image is removed with a high level, and an image with a high contrast and high color reproducibility can be provided.

In the present embodiment, an example is described in which the adhesive layer 6 is provided with light absorption properties so that the chromatic coordinate of a projector light source is match with that of displayed image on the screen. Otherwise, the diffusion layer 5 is provided with light absorption properties. In this case, it is preferred that a dye absorbing a light in a specific wavelength region and a black pigment of carbon black are added and dispersed in a resin constituting the diffusion layer 5.

It should be understood by those skilled in the art that various modifications, combinations, sub-combinations and alterations may occur depending on design requirements and other factors insofar as they are within the scope of the appended claims or the equivalents thereof.

What is claimed is:

1. A screen for displaying an image projected thereon by projection light, comprising:
    a substrate; and
    a selectively reflective layer on said substrate, said selectively reflective layer comprising a reflective layer and a optical multilayer film, said optically multilayer film comprising a dielectric film and a light-absorbing thin film,
    wherein,
    said selectively reflective layer reflects light having a specific wavelength or wavelengths corresponding to said projection light, and absorbs light having a wavelength or wavelengths other than said specific wavelength or wavelengths,
    said light-absorbing thin film is 5 nm to 20 nm thick and is formed from a material having a refractive index of 1 or more and an absorption coefficient of 0.5 or more, and
    said reflective layer reflects light which has passed through said optical multilayer film.

2. A screen according to claim 1, wherein said light-absorbing thin film is formed from a material selected from the group consisting of Nb, Nb alloys, C, Cr, Fe, Ge, Ni, Pd, Pt, Rh, Ti, TiN, $TiN_xW_y$, Mn, Ru, and PbTe.

3. A screen according to claim 1, wherein said dielectric film is formed from a material selected from the group consisting of $Nb_2O_5$, $TiO_2$, $Ta_2O_5$, $Al_2O_3$, and $SiO_2$.

4. A screen according to claim 1, wherein said reflective layer is a metallic substrate.

5. A screen according to claim 1, wherein said reflective layer is a metallic film.

6. A screen according to claim 5, wherein said reflective layer is formed from a material selected from the group consisting of Al, Nb, or Ag, or an alloy thereof.

7. A screen according to claim 1, further comprising a diffusion layer for scattering the reflected light from said selectively reflective layer.

8. A screen according to claim 7, further comprising an adhesive layer formed between said diffusion layer and said selectively reflective layer, combining both layers and including a coloring material which absorbs the light at said specific wavelength or wavelengths.

9. A screen according to claim 1, wherein a plurality of protruding portions or depressed portions is formed on a surface of said reflective layer where said optical multilayer film is formed thereon for scattering said reflected light from said selectively reflective layer.

10. A screen according to claim 1, wherein said specific wavelength region includes respective wavelength regions for a red light, green light, and blue light.

11. A screen according to claim 10, wherein said selectively reflective layer has reflection properties such that reflection intensities in said wavelength or wavelengths are adjusted according to the intensities of said projection light of a light source in the wavelength or wavelengths of the respective RGB colors.

12. A screen according to claim 1, wherein said specific wavelength or wavelengths having absorption properties includes the bright line peak of light from a fluorescent light.

13. A screen according to claim 1, wherein said wavelength or wavelengths having absorption properties is aninged at the wavelengths between a wavelength of the bright line peak of red component and that of green component, and between a wavelength of the bright line peak of green component and that of blue component of said projection light respectively.

14. A method for manufacturing a screen comprising the steps of:
    providing a metallic substrate; and
    forming on the substrate, a selectively reflective layer which reflects light having a specific wavelength or wavelengths and absorbs light having a wavelength or wavelengths other than the specific wavelength or wavelengths,
    wherein,
    the step fir firming the selectively reflective layer comprises firming an optical multilayer film including a dielectric film and a 5 nm to 20 nm thick light-absorbing thin film formed from a material having a refractive index of 1 or more and an absorption coefficient of 0.5 or more.

15. A method for manufacturing a screen according to claim 14, wherein said optical multilayer film is formed by sputtering method.

16. A method for manufacturing a screen according to claim 14, wherein said metallic substrate is formed from a material selected from the group consisting of Al, Nb, or Ag, or an alloy thereof.

17. A method for manufacturing a screen according to claim 14, wherein said light-absorbing thin film is formed from a material selected from the group consisting of Nb, Nb alloys, C, Cr, Fe, Ge, Ni, Pd, Pt, Rh, Ti, TiN, $TiN_xW_y$, Mn, Ru, and PbTe.

18. A method for manufacturing a screen according to claim 14, wherein said dielectric film is formed from a material selected from the group consisting of $Nb_2O_5$, $TiO_2$, $Ta_2O_5$, $Al_2O_3$, and $SiO_2$.

19. A method for manufacturing a screen according to claim 14, further comprising a step for forming a diffusion layer on said optical multilayer film for scattering light.

20. A method for manufacturing a screen according to claim 19, wherein said step for forming a diffusion layer comprises a step for bonding said diffusion layer to said optical multilayer film through an adhesive layer having a coloring material which absorbs light in said specific wavelength region.

21. A method for manufacturing a screen according to claim 14, wherein a plurality of protruding portions or depressed portions is formed on a surface of said metal substrate where said optical multilayer film is formed.

22. A method for manufacturing a screen according to claim 14, wherein said specific wavelength or wavelengths includes respective wavelength or wavelengths for a red light, green light, and blue light.

23. A method for manufacturing a screen according to claim 14, wherein said specific wavelength or wavelengths having absorption properties includes the bright line peak of light from a fluorescent light.

24. A method for manufacturing a screen according to claim 14, wherein said wavelength or wavelengths having absorption properties is arranged at the wavelengths between a wavelength of the bright line peak of red component and that of green component, and between a wavelength of the bright line peak of green component and that of blue component of a possible light source respectively.

25. A method for manufacturing a screen, said method comprising the steps of:
providing a metallic substrate; and
forming, on the substrate, a selectively reflective layer which reflects light having a specific wavelength or wavelengths and absorbs light having a wavelength or wavelengths other than said specific wavelength or wavelengths,
wherein,
the step for forming the selectively reflective layer comprises forming an optical multilayer film including a dielectric film and a 5 nm to 20 nm thick light-absorbing thin film formed from a material having a refractive index of 1 or more and an absorption coefficient of 0.5 or more.

26. A method for manufacturing a screen according to claim 25, wherein said metallic film and said optical multilayer film are formed by sputtering method.

27. A method for manufacturing a screen according to claim 25, wherein said metallic film is formed from a material selected from the group consisting of Al, Nb, or Ag, or an alloy thereof.

28. A method for manufacturing a screen according to claim 25, wherein said light-absorbing thin film is formed from a material selected from the group consisting of Nb, Nb alloys, C, Cr, Fe, Ge, Ni, Pd, Pt, Rh, Ti, TiN, $TiN_xW_y$, Mn, Ru, and PbTe.

29. A method for manufacturing a screen according to claim 25, wherein said dielectric film is formed from a material selected from the group consisting of $Nb_2O_5$, $TiO_2$, $Ta_2O_5$, $Al_2O_3$, and $SiO_2$.

30. A method for manufacturing a screen according to claim 25, further comprising a step for forming a diffusion layer on said optical multilayer film for scattering light.

31. A method for manufacturing a screen according to claim 30, wherein said step for forming a diffusion layer comprises a step for bonding said diffusion layer to said optical multilayer film through an adhesive layer having a coloring material which absorbs light at said specific wavelength or wavelengths.

32. A method for manufacturing a screen according to claim 25, wherein a plurality of protruding portions or depressed portions is formed on a surface of said substrate where said metallic film is formed.

33. A method for manufacturing a screen according to claim 25, wherein said specific wavelength or wavelengths includes respective wavelength for a red light, green light, and blue light.

34. A method for manufacturing a screen according to claim 25, wherein said specific wavelength or wavelengths having absorption properties includes the bright line peak of light from a fluorescent light.

35. A method for manufacturing a screen according to claim 25, wherein said wavelength or wavelengths having absorption properties is arranged at the wavelengths between a wavelength of the bright line peak of red component and that of green component, and between a wavelength of the bright line peak of green component and that of blue component of a possible light source respectively.

36. A method for manufacturing a screen, said method comprising the steps of:
providing a diffuser panel; and
forming a selectively reflective layer which reflects light having a specific wavelength or wavelengths and absorbs light having a wavelength or wavelengths other than the specific wavelength or wavelengths,
wherein,
the step for forming a selectively reflective layer comprises forming, on the back surface of the diffuser panel, an optical multilayer-film including a dielectric film and a 5 nm to 20 nm thick light-absorbing thin film formed from a material having a refractive index of 1 or more and an absorption coefficient of 0.5 or more, and forming a metallic film on the optical multilayer film.

37. A method for manufacturing a screen according to claim 36, wherein said optical multilayer film and said metallic film are formed by sputtering method.

38. A method for manufacturing a screen according to claim 36, wherein said light-absorbing thin film is formed from a material selected from the group consisting of Nb, Nb alloys, C, Cr, Fe, Ge, Ni, Pd, Pt, Rh, Ti, TiN, $TiN_xW_y$, Mn, Ru, and PbTe.

39. A method for manufacturing a screen according to claim 36, wherein said dielectric film is formed from a material selected from the group consisting of $Nb_2O_5$, $TiO_2$, $Ta_2O_5$, $Al_2O_3$, and $SiO_2$.

40. A method for manufacturing a screen according to claim 36, wherein said metallic film is formed from a material selected from the group consisting of Al, Nb, or Ag, or an alloy thereof.

41. A method for manufacturing a screen according to claim 36, wherein said specific wavelength or wavelengths includes respective wavelength or wavelengths for a red light, green light, and blue light.

42. A method for manufacturing a screen according to claim 36, wherein said specific wavelength or wavelengths having absorption properties includes the bright line peak of light from a fluorescent light.

43. A method for manufacturing a screen according to claim 36, wherein said wavelength or wavelengths having absorption properties is arranged at the wavelengths between a wavelength of the bright line peak of red component and that of green component, and between a wavelength of the bright line peak of green component and that of blue component of a possible light source respectively.

* * * * *